United States Patent
Nomura et al.

(10) Patent No.: US 6,324,364 B1
(45) Date of Patent: Nov. 27, 2001

(54) ELECTROPHOTOGRAPHIC PHOTOSENSITIVE DRUM, PROCESS CARTRIDGE, AND ELECTROPHOTOGRAPHIC IMAGE FORMING APPARATUS

(75) Inventors: Yoshiya Nomura, Tokyo; Satoshi Kurihara; Teruhiko Sasaki, both of Toride, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/557,960

(22) Filed: Apr. 25, 2000

(30) Foreign Application Priority Data

Apr. 28, 1999 (JP) .................................................. 11-122021

(51) Int. Cl.$^7$ ............................ G03G 21/16; F16C 13/00
(52) U.S. Cl. ............................... 399/111; 399/116; 492/45
(58) Field of Search ..................................... 399/103, 111, 399/116; 492/22, 45, 47

(56) References Cited

U.S. PATENT DOCUMENTS

| | | | | |
|---|---|---|---|---|
| 4,373,468 | * | 2/1983 | Suda et al. | 399/103 |
| 4,751,776 | * | 6/1988 | Reunamaki | 492/47 |
| 5,461,464 | * | 10/1995 | Swain | 492/47 X |
| 5,469,619 | * | 11/1995 | Renek | 492/47 X |
| 5,729,792 | * | 3/1998 | Ikehara | 399/116 X |
| 5,771,425 | | 6/1998 | Yamada et al. | 399/111 |

* cited by examiner

Primary Examiner—Fred L Braun
(74) Attorney, Agent, or Firm—Fitzpatrick, Cella, Harper & Scinto

(57) ABSTRACT

A cylindrical electrophotographic photosensitive drum of an electrophotographic image forming apparatus includes plural holes penetrating a metallic hollow cylindrical base body in a radial direction near its end portion, where the end portion of the base body and the holes are filled with resin, and a flange is formed by outset molding so as to integrate the base body and the flange.

13 Claims, 17 Drawing Sheets

ELECTROPHOTOGRAPHIC PHOTOSENSITIVE DRUM, PROCESS CARTRIDGE, AND ELECTROPHOTOGRAPHIC IMAGE FORMING APPARATUS

BACKGROUND OF THE INVENTION

1. Field of the Invention

The present invention relates to an electrophotographic photosensitive drum, a process cartridge detachably mountable to a main body of an electrophotographic image forming apparatus, and the electrophotographic image forming apparatus.

An electrophotographic image forming apparatus is an apparatus for forming an image on a recording medium by using an electrophotographic image forming system. For example, such electrophotographic image forming apparatuses include an electrophotographic copying machine, an electrophotographic printer (e.g., a laser beam printer, an LED printer, etc.), a facsimile telegraph, a word processor, etc.

The process cartridge may be a cartridge into which charging means, developing means or cleaning means and an electrophotographic photosensitive drum are integrally incorporated, and which is detachably mountable to the main body of the image forming apparatus. Alternatively, the process cartridge may be a cartridge into which at least one of the charging means, the developing means and the cleaning means, and the electrophotographic photosensitive drum are integrally incorporated, and which is detachably mountable to the main body of the image forming apparatus. Further alternatively, the process cartridge may be a cartridge into which at least the developing means and the electrophotographic photosensitive drum are integrally incorporated, and which is detachably mountable to the apparatus main body.

2. Related Background Art

An electrophotographic image forming apparatus using an electrophotographic image forming process conventionally adopts a process cartridge system in which the electrophotographic photosensitive drum and process means acting on this electrophotographic photosensitive drum are integrally made into a cartridge and this cartridge can be detachably mounted to the main body of the image forming apparatus. In accordance with this process cartridge system, the image forming apparatus can be maintained by a user himself without any service man so that operability can be greatly improved. Therefore, this process cartridge system is widely used in the electrophotographic image forming apparatus.

An electrophotographic image forming apparatus for replenishing toner by a toner replenishing device is also used while the electrophotographic photosensitive drum and a developing device are built in the main body of the image forming apparatus.

In the electrophotographic photosensitive drum (hereinafter referred to as a photosensitive drum) used in such an electrophotographic image forming apparatus, a metallic cylindrical base body made of aluminum, for example, is coated with a photoconductor such as an OPC, and is set to the photosensitive drum, and a gear flange or a flange having a coupling to receive driving force is mounted to an end portion of the photosensitive drum.

A method for adhering the gear flange is conventionally adopted as a method for mounting this gear flange to the photosensitive drum. However, in using such adhesion, it is necessary to strictly control the amount of the adhesive, and the temperature and humidity during adhesion. Further, fitting sizes of the gear flange and the photosensitive drum must be maintained with required accuracy. If the clearance between the gear flange and the photosensitive drum is too large, sufficient adhesive force can not be obtained. If an outer shape of the flange is too large, so that the flange is press fit into the photosensitive drum, the photosensitive drum may be deformed. Further, a curing time is required so as to obtain sufficient adhesive force after an adhesive process.

Therefore, so-called caulking for plastically deforming one portion of the cylinder after the gear flange is inserted into the photosensitive drum, and integrating the cylinder with the gear flange is proposed and executed (e.g., U.S. Pat. No. 5,771,425).

Here, caulking coupling will be explained with reference to FIGS. 25 to 29. FIG. 25 is a side view of the photosensitive drum and the gear flange before they are coupled to each other. FIG. 26 is a partial front view of the gear flange. FIG. 27 is a cross-sectional view of the gear flange and the photosensitive drum when the gear flange is inserted into the photosensitive drum. FIG. 28 is a view explaining a caulking process. FIG. 29 is a perspective view of a photosensitive drum unit after the caulking process.

The caulking process will sequentially be explained. First, a gear flange 2 is inserted into the end of a photosensitive drum 7, which includes a metallic cylinder having a photosensitive layer on its outer circumference. At this time, the position of a caulking hole 2k formed in the gear flange 2 is adjusted such that this position is in phase conformity (registration) with that of a punch 45 of a caulking tool. To facilitate this adjustment, a rib 2m is formed in the gear flange 2 in advance in a position conforming to the caulking hole 2k in a circumferential direction, and a function for detecting the position of the rib 2m is provided in a chucking tool of the gear flange 2 so as to conform the positions of the caulking hole 2k and the punch 45 to each other in phase when inserting the gear flange 2 into the photosensitive drum 7. Next, the punch 45 of the caulking tool is moved in a direction indicated by an arrow of FIG. 28 and the metallic cylinder is cut so as to form a tab which is bent toward an inner side in the conforming position, into the caulking hole 2k, so that a cut bent (tab) portion 7t is formed. The cut bent (tab) portion 7t of the metallic cylinder bites into the gear flange 2 so that the photosensitive drum 7 and the gear flange 2 are integrated with each other. Therefore, high reliability can be secured since dislocation and running idle of the gear flange 2 are prevented.

The present invention is made by further developing the above-mentioned background art.

SUMMARY OF THE INVENTION

An object of the present invention is to provide an electrophotographic photosensitive drum, a process cartridge and an electrophotographic image forming apparatus having this electrophotographic photosensitive drum in which an electrophotographic photosensitive drum is not deformed by coupling its base body and a flange to each other while reliability of the coupling of the flange is maintained.

Another object of the present invention is to provide an electrophotographic photosensitive drum able to be further shortened in length, and a process cartridge and an electrophotographic image forming apparatus having this electrophotographic photosensitive drum.

According to the present invention, there is provided a cylindrical electrophotographic photosensitive drum of an electrophotographic image forming apparatus, wherein plural holes penetrating a metallic hollow cylindrical base body in a radial direction near its end portion are formed, and the end portion of the base body and the holes are filled with resin, and a flange is formed by outset molding so as to integrate the base body and the flange.

According to the present invention, there is provided a process cartridge detachably mountable to a main body of an electrophotographic image forming apparatus, the cartridge comprising: an electrophotographic photosensitive drum in which plural holes penetrating a metallic hollow cylindrical base body in a radial direction near its end portion are formed, and the end portion of the base body and the holes are filled with resin, and a flange is formed by outsert molding so as to integrate the base body and the flange; and process means acting on the electrophotographic photosensitive drum.

According to the present invention, there is provided an electrophotographic image forming apparatus for forming an image in a recording medium, the apparatus comprising: an electrophotographic photosensitive drum in which plural holes penetrating a metallic hollow cylindrical base body in a radial direction near its end portion are formed, and the end portion of the base body and the holes are filled with resin, and a flange is formed by outsert molding so as to integrate the base body and the flange; process means acting on the electrophotographic photosensitive drum; and conveying means for conveying the recording medium.

These and other objects, features and advantages of the present invention will become more apparent upon consideration of the following description of the preferred embodiments of the present invention taken in conjunction with the accompanying drawings.

Figure 7:
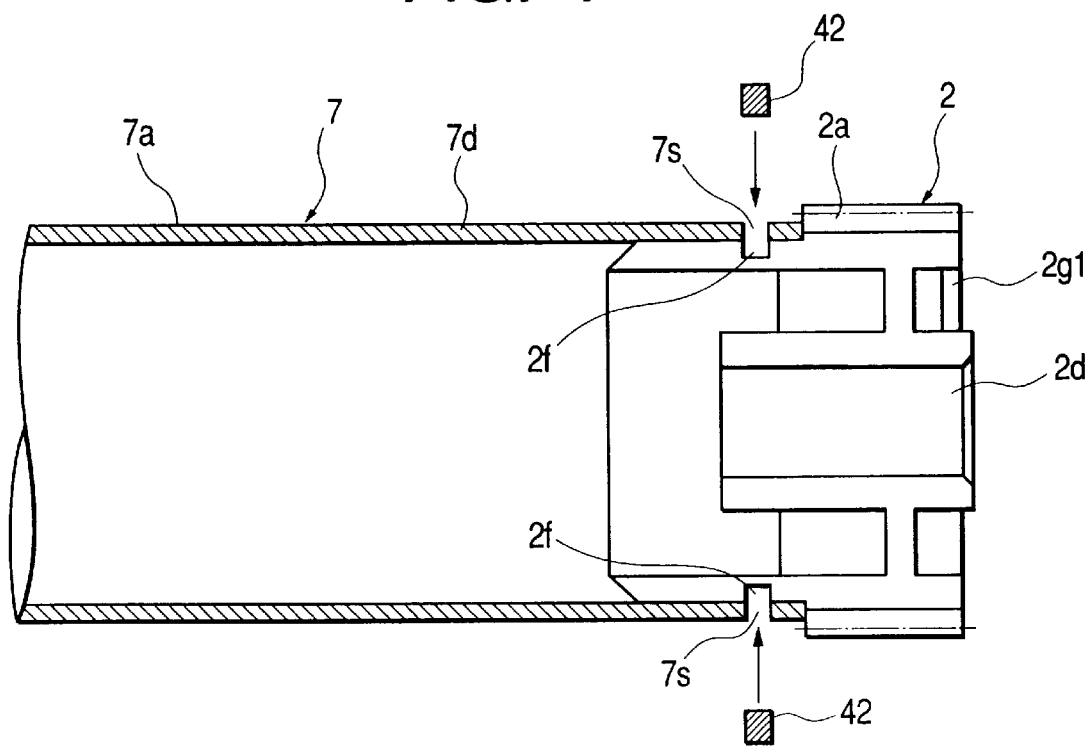
Figure 8:
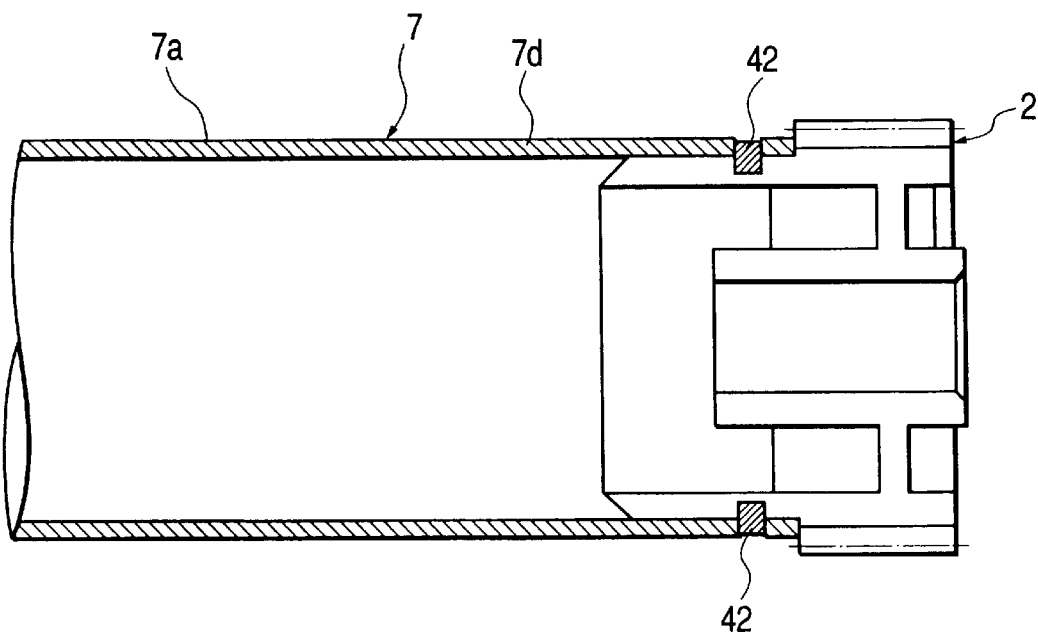
Figure 9:
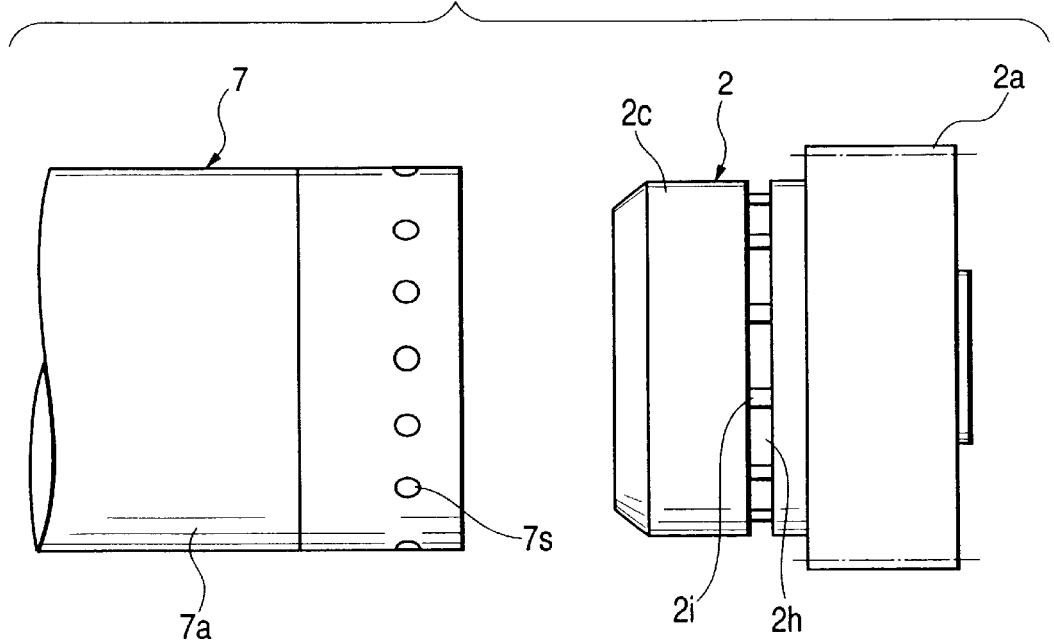
Figure 10:
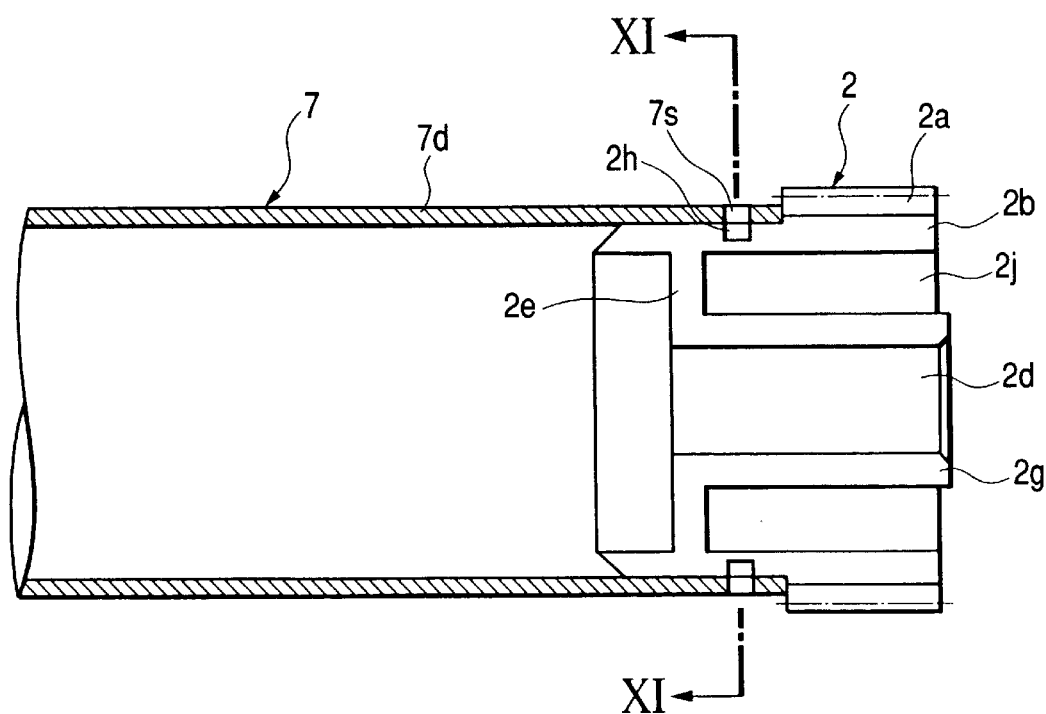
Figure 11:
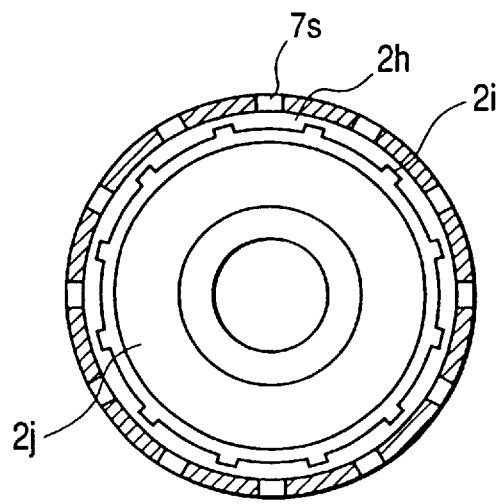
Figure 12:
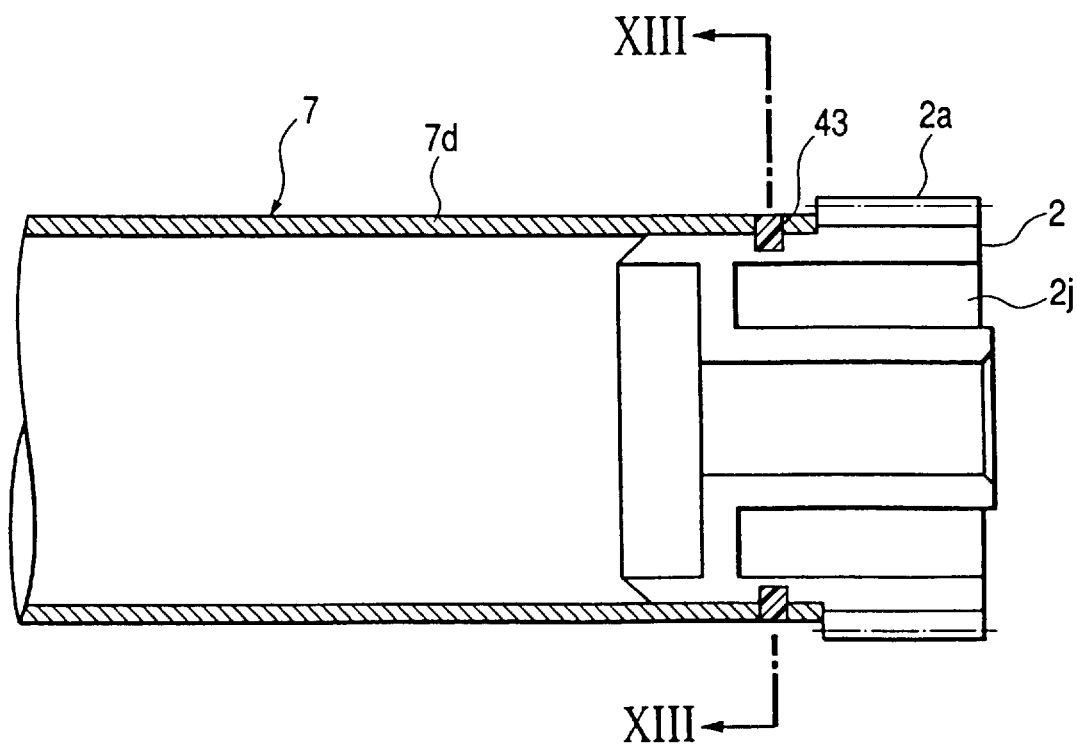
Figure 13:
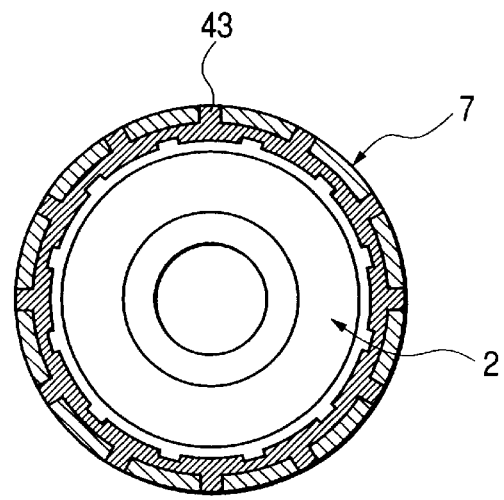
Figure 14:
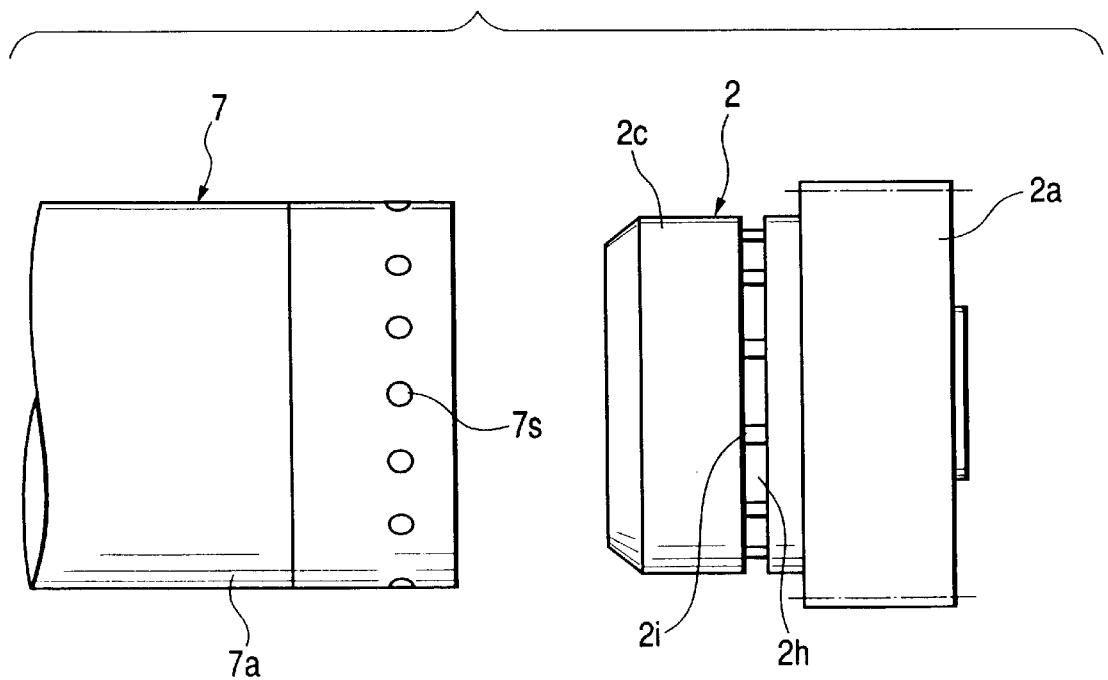
Figure 15:
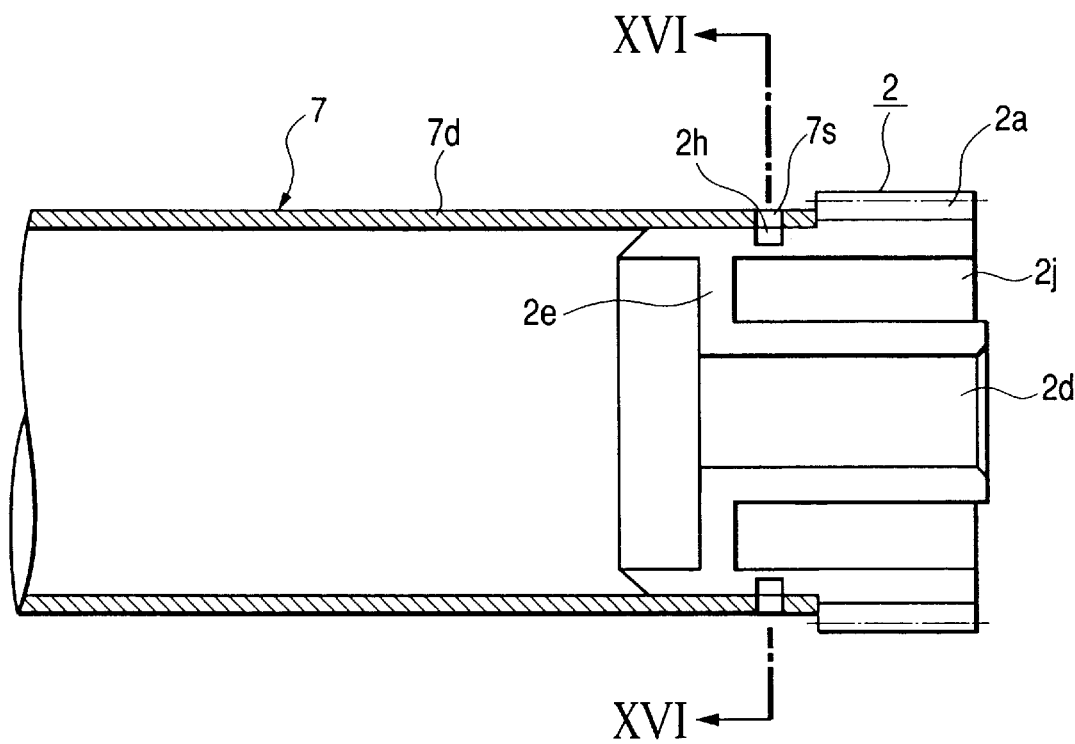
Figure 16:
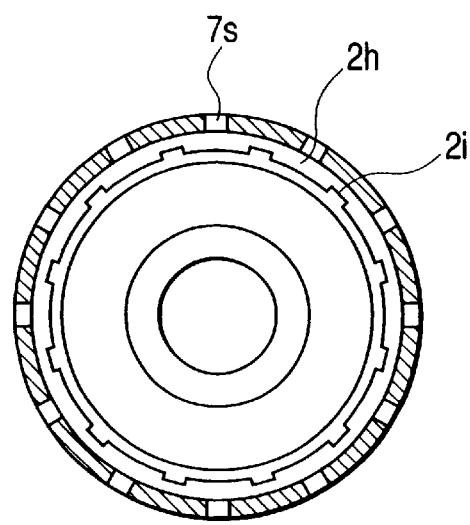
Figure 17:
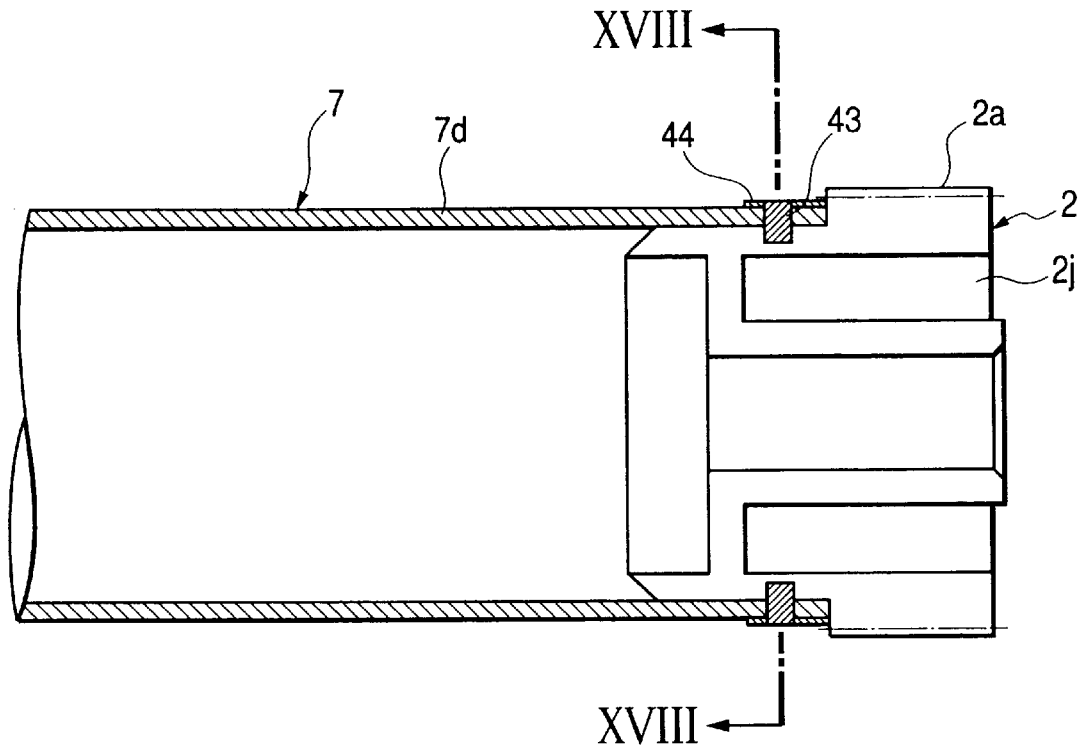
Figure 18:
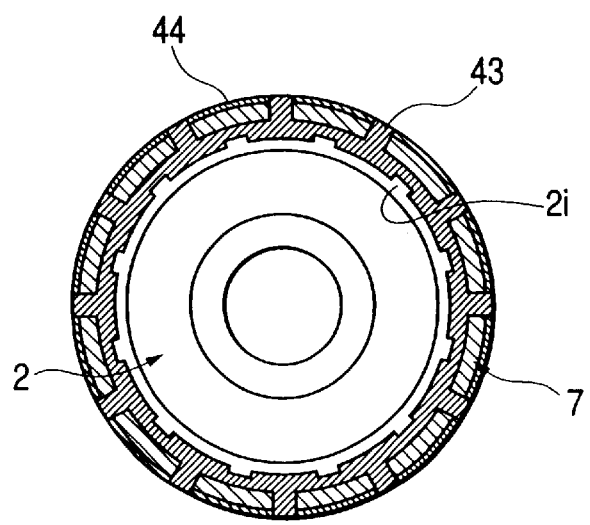
Figure 19:
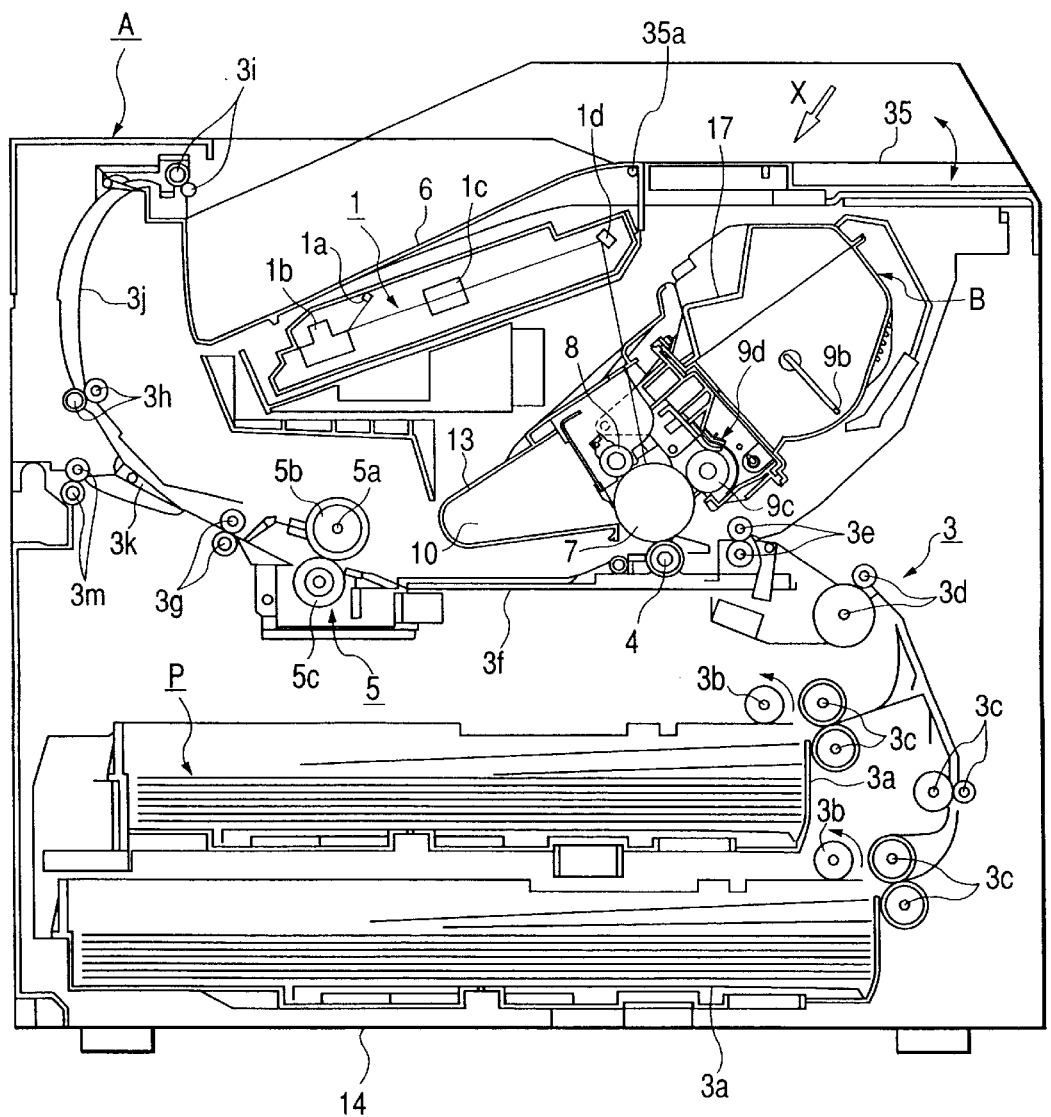
Figure 20:
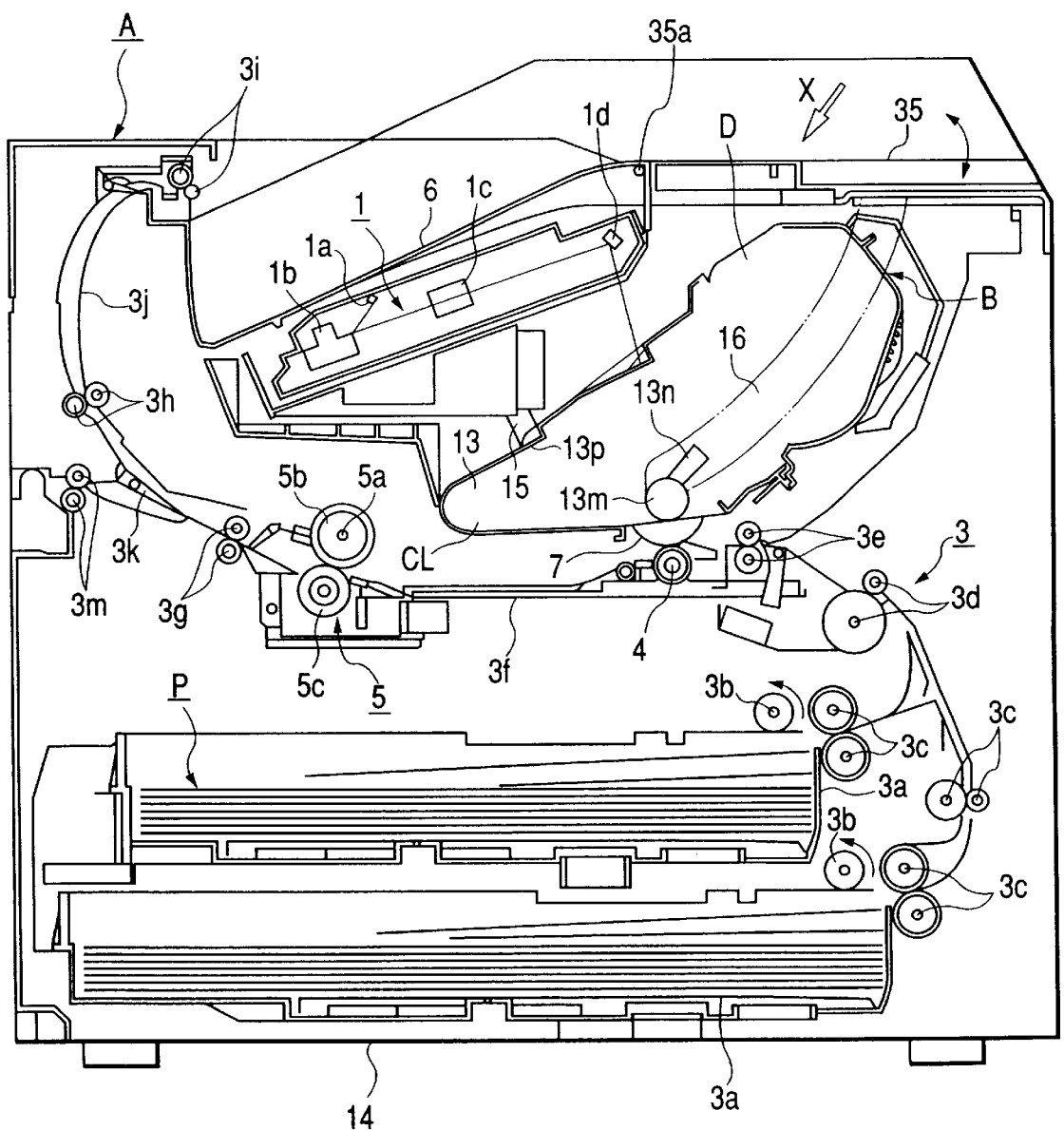
Figure 21:
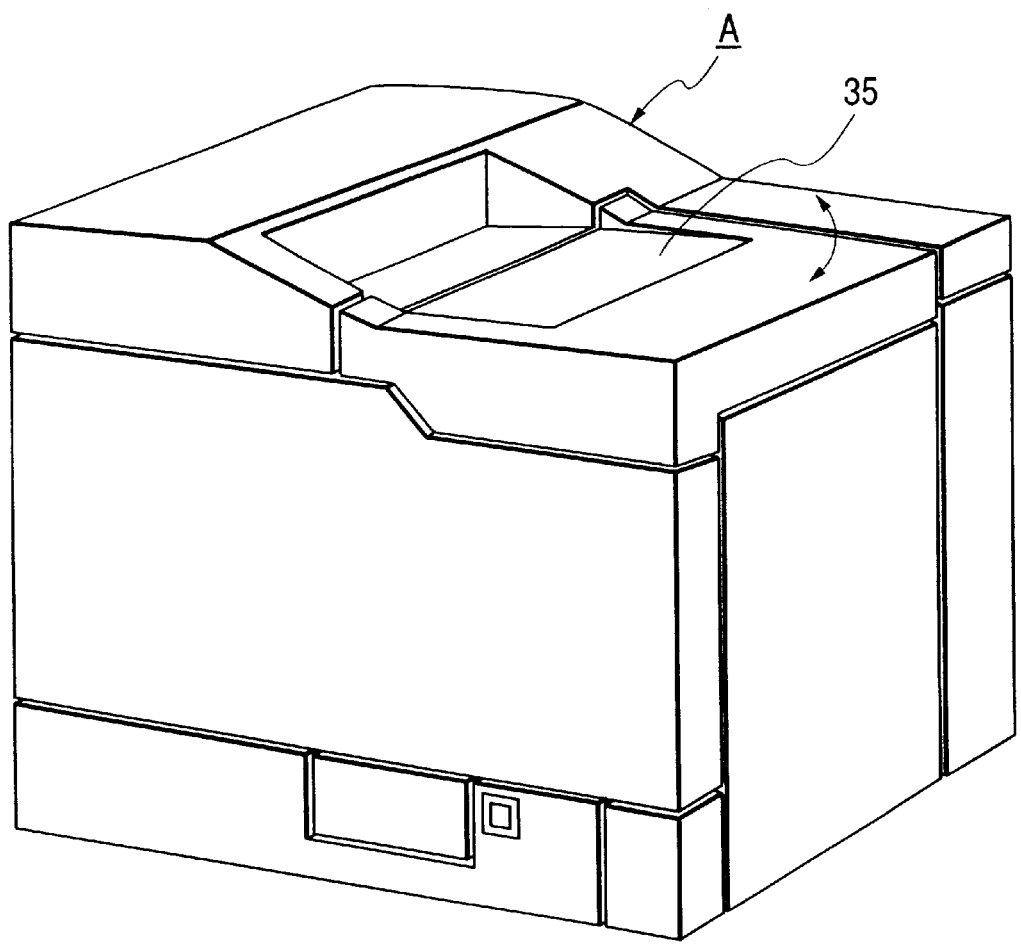
Figure 22:
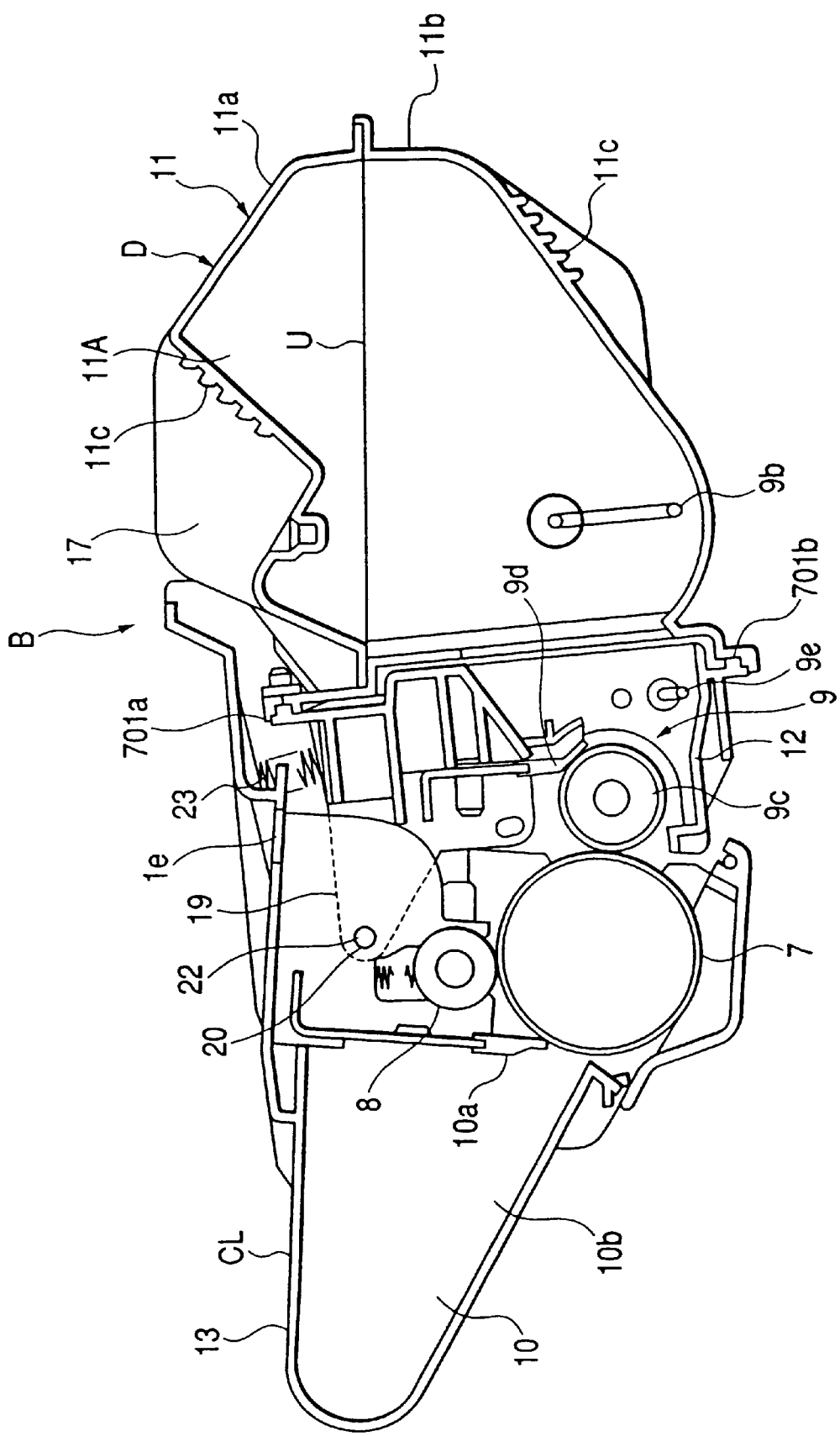
Figure 23:
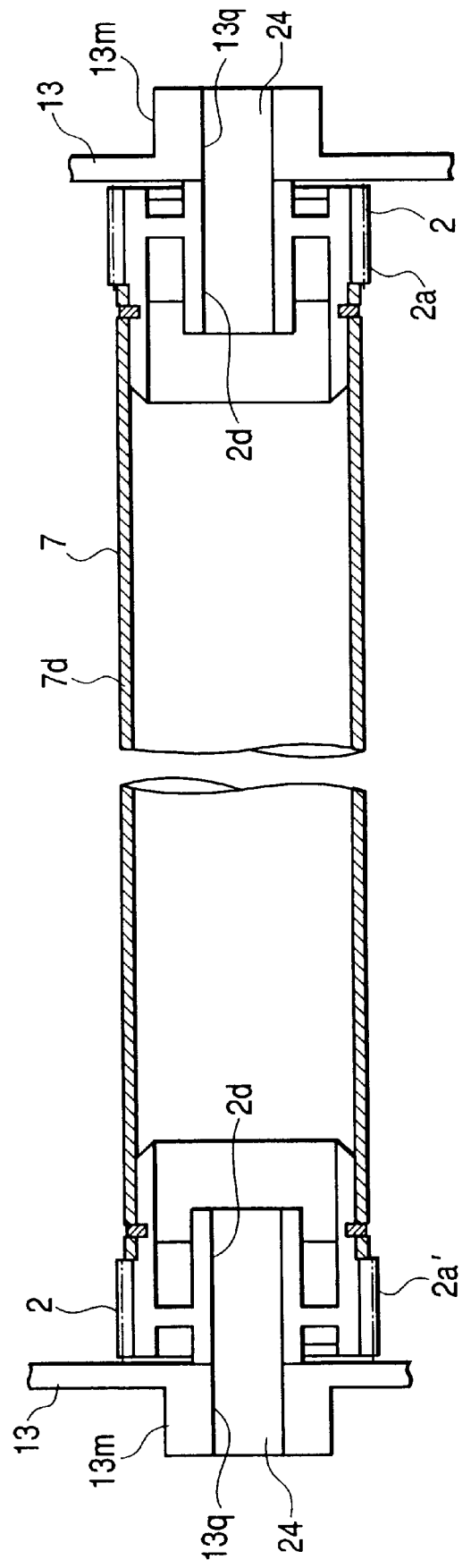
Figure 24:
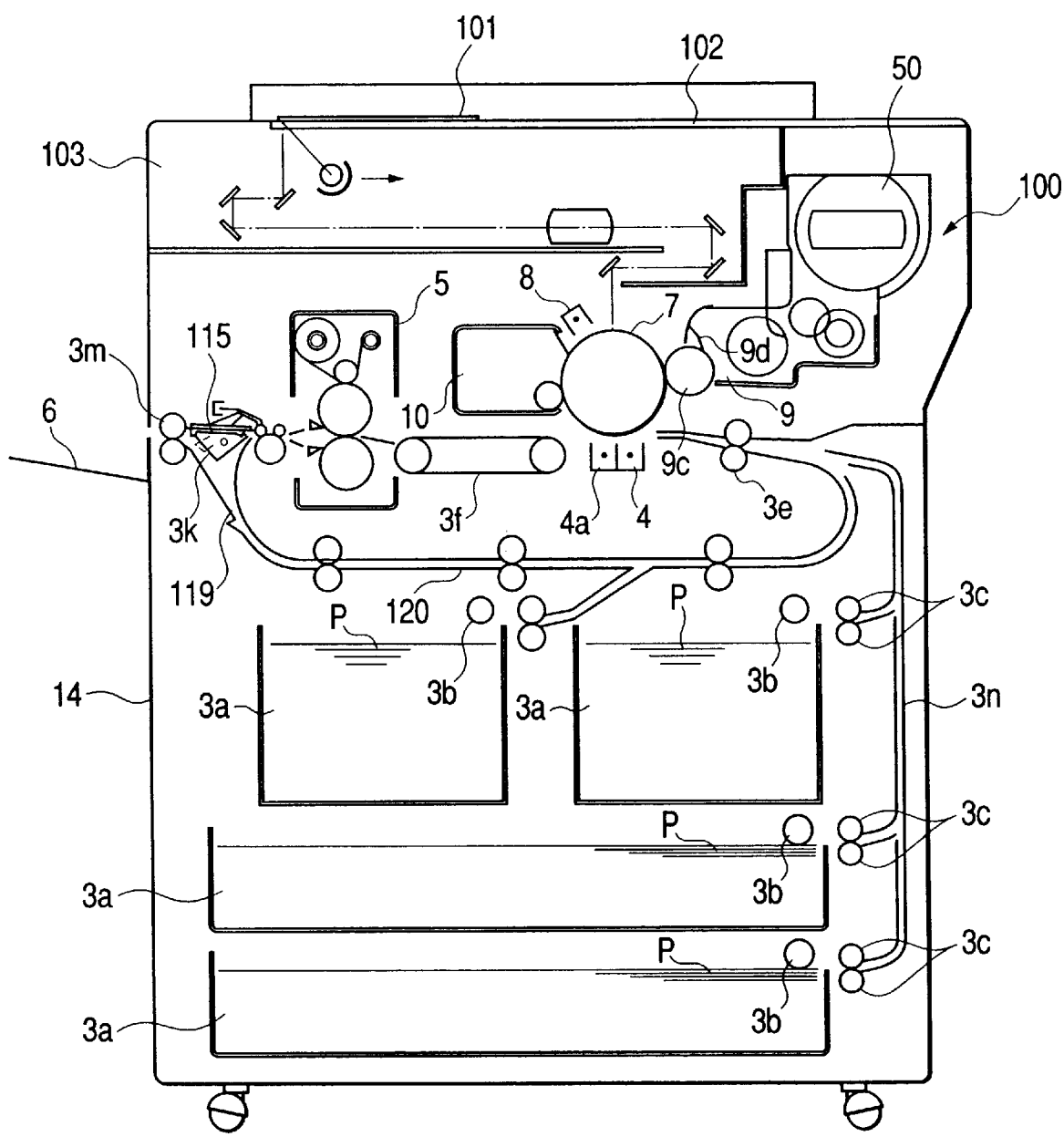
Figure 25:
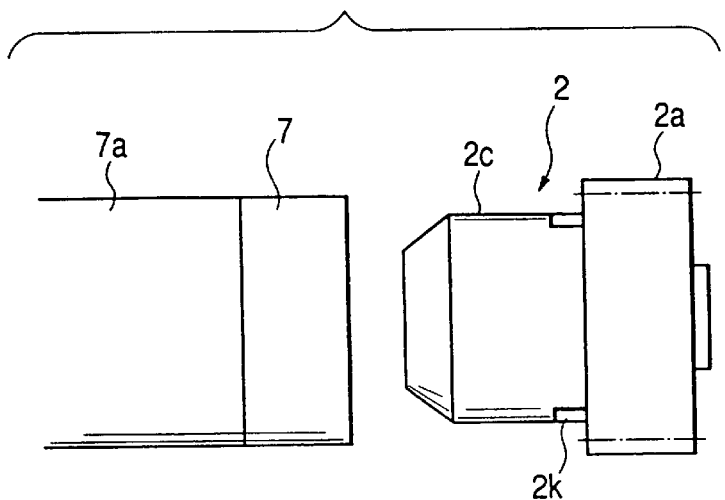
Figure 26:
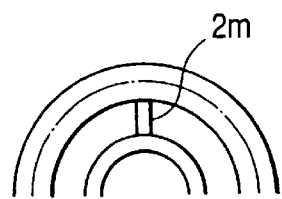
Figure 27:
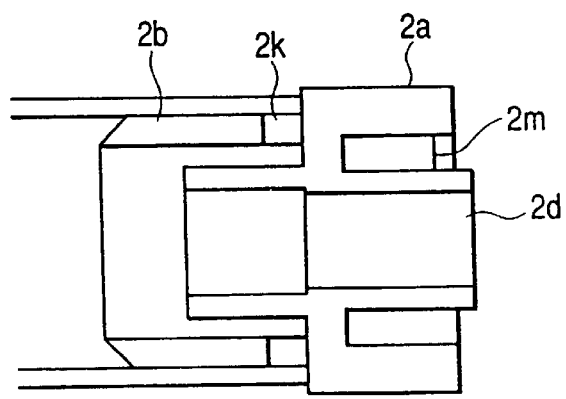
Figure 28:
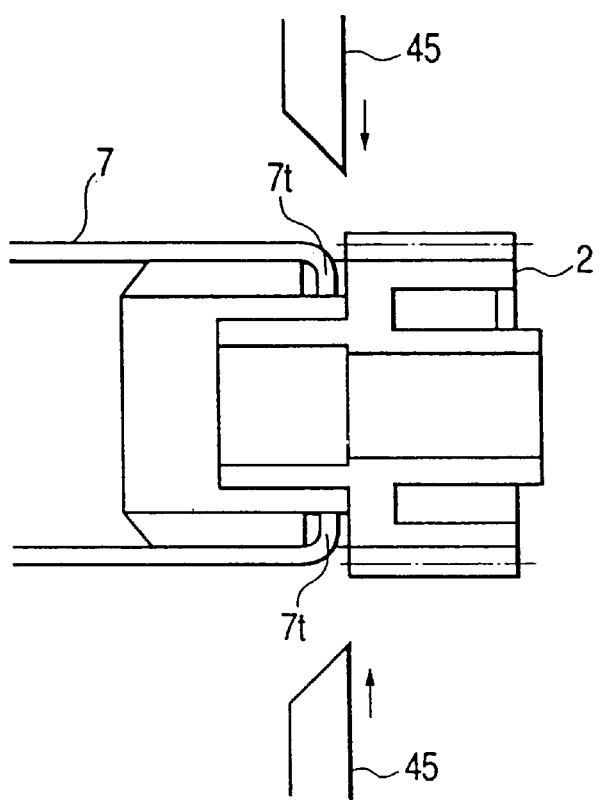
Figure 29:
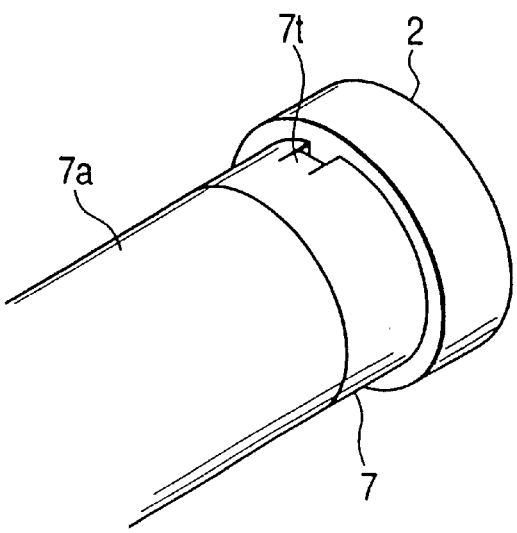

As FIG. 7 is a longitudinal sectional view showing an assembly process in the embodiment 2;

FIG. 8 is a longitudinal sectional view of the photosensitive drum in the embodiment 2;

FIG. 9 is a side view of a flange and a drum cylinder of a photosensitive drum in an embodiment 3;

FIG. 10 is a longitudinal sectional view showing an assembly process in the embodiment 3;

FIG. 11 is a cross-sectional view taken along the line XI—XI of FIG. 10;

FIG. 12 is a longitudinal sectional view of the photosensitive drum in the embodiment 3;

FIG. 13 is a cross-sectional view taken along the line XIII—XIII of FIG. 12;

FIG. 14 is a side view of a flange and a photosensitive drum in an embodiment 4;

FIG. 15 is a longitudinal sectional view showing an assembly process in the embodiment 4;

FIG. 16 is a cross-sectional view taken along the line XVI—XVI of FIG. 15;

FIG. 17 is a longitudinal sectional view of the photosensitive drum in the embodiment 4;

FIG. 18 is a cross-sectional view taken along the line XVIII—XVIII of FIG. 17;

FIG. 19 is a longitudinal sectional view of an electrophotographic image forming apparatus;

FIG. 20 is a longitudinal sectional view of the electrophotographic image forming apparatus;

FIG. 21 is a perspective view of the electrophotographic image forming apparatus of FIG. 20;

FIG. 22 is a longitudinal sectional view of a process cartridge;

FIG. 23 is a longitudinal sectional view of the electrophotographic photosensitive drum;

FIG. 24 is a longitudinal sectional view of the electrophotographic image forming apparatus;

FIG. 25 is a side view of a flange and a drum cylinder of a photosensitive drum in a conventional example;

FIG. 26 is a partial front view of the flange of FIG. 25;

FIG. 27 is a longitudinal sectional view showing an assembly process in the conventional example;

FIG. 28 is a longitudinal sectional view showing the assembly process in the conventional example; and FIG. 29 is a perspective view showing a coupling portion of the conventional drum cylinder and the flange.

DESCRIPTION OF THE PREFERRED EMBODIMENTS

Preferred embodiments of the present invention will hereinafter be explained in detail with reference to the drawings.

In the following embodiments described in detail, a hole 7b is formed on the circumference of an end portion of a cylinder 7d of a photosensitive drum 7, and a gear flange 2 is outsert-molded so as to cover the hole 7b. Thus, the cylinder 7d is not deformed by the coupling. Accordingly, a clearance roller of a developing roller is received by the drum end portion so that an overall drum length can be shortened.

Preferred embodiments applying the present invention thereto will next be explained. In the following explanation, a transverse direction of a process cartridge B is a direction in which the process cartridge B is detachably mounted to an apparatus main body 14. This transverse direction is in conformity with a conveying direction of a recording medium. A longitudinal direction of the process cartridge B is a direction crossing (approximately perpendicular to) a direction in which the process cartridge B is detachably mounted to the apparatus main body 14. The longitudinal direction is a direction parallel to a surface of the recording medium and crossing (approximately perpendicular to) the conveying direction of the recording medium. Left-hand and right-hand sides with respect to the process cartridge are the right-hand side and the left-hand side when the recording medium is seen from above in the conveying direction of the recording medium.

Each of FIGS. 19 and 20 is an explanatory view of the construction of an electrophotographic image forming apparatus (a laser beam printer) to which an embodiment of the present invention is applied. FIG. 21 is a perspective view of an external appearance of the electrophotographic image forming apparatus. FIG. 22 is a view with respect to the process cartridge to which the embodiment of the present invention is applied. In the following explanation, an upper face of the process cartridge B is a face located upward in a state in which the process cartridge B is mounted to the apparatus main body 14. A lower face of the process cartridge B is a face located downward in this state.

Electrophotographic Image Forming Apparatus A and Process Cartridge B

The laser beam printer A as an electrophotographic image forming apparatus applying the embodiment of the present invention thereto will first be explained with reference to FIGS. 19 and 21. FIG. 22 shows a side sectional view of the process cartridge B.

As shown in FIG. 19, this laser beam printer A forms an image on a recording medium (e.g., recording paper, an OHP sheet, cloth, etc.) by an electrophotographic image forming process. A toner image is formed on a drum-shaped electrophotographic photosensitive member (hereinafter referred to as a photosensitive drum). More particularly, the photosensitive drum is charged by charging means and a laser beam modulated according to image information is irradiated from optical means onto the photosensitive drum so that a latent image is formed on the photosensitive drum in accordance with the image information. A toner image is formed by developing this latent image using developing means. The surfaces of the recording medium P set to a feed cassette 3a are reversed and conveyed by a pickup roller 3b, pairs of conveying rollers 3c, 3d and a pair of registration rollers 3e in synchronism with the formation of the above toner image. Next, the toner image formed on the above photosensitive drum 7 arranged in the process cartridge B is transferred to the recording medium P by applying a voltage to a transfer roller 4 as transfer means. Thereafter, the recording medium P having the transferred toner image is conveyed to a fixer 5 by a conveying guide 3f. This fixing means 5 has a driving roller 5c and a fixing roller 5b having a heater 5a therein. The transferred toner image is fixed to the passing recording medium P by heating and pressing this recording medium P. The recording medium P is conveyed by pairs of discharge rollers 3g, 3h, 3i and is discharged to a discharge tray 6 through a surface reverse path 3j. The discharge tray 6 is arranged on an upper face of the apparatus main body 14 of the image forming apparatus A. A pivotally movable flipper 3k can be operated and the recording medium P can be also discharged by a pair of alternate discharge rollers 3m without passing through the surface reverse path 3j. In this embodiment, conveying means 3 is constructed by the above pickup roller 3b, the conveying roller pairs 3c, 3d, the registration roller pair 3e, the conveying guide 3f, the discharge roller pairs 3g, 3h, 3i and the alternate discharge roller pair 3m.

In the above process cartridge B, as shown in FIGS. 19 and 22, the photosensitive drum 7 is rotated and its surface is uniformly charged by applying a voltage to a charging roller 8 as the charging means. Next, a laser beam modulated according to image information from an optical system 1 is irradiated onto the photosensitive drum 7 through an exposure opening portion 1e (see FIG. 22) so that a latent image is formed. This latent image is developed by the developing means 9 using toner. Namely, the charging roller 8 is arranged in contact with the photosensitive drum 7 and the photosensitive drum 7 is charged by the charging roller 8. The charging roller 8 is driven and rotated by the photosensitive drum 7. The developing means 9 supplies toner to a developing area of the photosensitive drum 7 and develops the latent image formed on the photosensitive drum 7. The optical system 1 has a laser diode 1a, a polygon mirror 1b, a lens 1c and a reflective mirror 1d.

Here, the above developing means 9 sends out the toner within a toner container 11A to a developing roller 9c by rotating a toner feeding member 9b. The developing roller 9c having a stationary magnet therein is rotated and a toner layer having triboelectrification charges caused by a developing blade 9d is formed on a surface of the developing roller 9c. This toner is supplied to the developing area of the photosensitive drum 7. This toner is transferred to the photosensitive drum 7 in accordance with the above latent image so that the toner image is formed and visualized. Here, the developing blade 9d regulates a toner amount on a circumferential face of the developing roller 9c and gives the triboelectrification charges. A toner agitating member 9e for circulating the toner within a developing chamber is rotatably mounted to a portion near this developing roller 9c.

A voltage of a polarity opposite to that of the above toner image is applied to the transfer roller 4, and the toner image formed on the photosensitive drum 7 is transferred to the recording medium P. Thereafter, residual toner on the photosensitive drum 7 is removed therefrom by cleaning means 10. Here the cleaning means 10 scrapes off the residual toner on the photosensitive drum 7 with an elastic cleaning blade 10a arranged in abutment against the photosensitive drum 7 and collects the scraped off toner into a removed toner reservoir 10b.

When an opening-closing member 35 arranged in a right-hand upper portion of the apparatus main body 14 shown in FIGS. 19, 20 and 21 is opened with a hinge 35a as a fulcrum, a guide rail 16 is slantingly arranged from a right-hand upper side to a left-hand lower side as shown by a two-dotted chain line on both left-hand and right-hand sides of the apparatus main body 14 in its right-hand upper portion as shown in FIG. 20. In contrast to this, as shown in FIG. 20, a round guide 13m is arranged in a cleaning frame 13 on a central line of the photosensitive drum 7 of the process cartridge B and is fitted to positioning grooves formed at a terminal end of the above guide rail 16 on both left-hand and right-hand sides of the cleaning frame 13. An attitude determining guide 13n having a long projecting shape is integrated with the round guide 13m, or is separated from this round guide 13m. The attitude determining guide 13n is fitted to the guide rail 16 and extends along the guide rail 16. This round guide 13m and the attitude determining guide 13n are inserted into the above guide rail 16 and the process cartridge B is mounted to the apparatus main body 14 in a direction indicated by an arrow X in FIG. 20. Thus, since moment in the clockwise direction caused by a developing unit D is greater than moment in the counterclockwise direction caused by a cleaning unit CL with the round guide 13m as a center, a restriction abutment portion 13p formed on an upper face of the cleaning frame 13 hits against a striking member 15 fixed to the main body 14 of the image forming apparatus and stops a movement of the differential moment obtained by subtracting the above moments from each other. The developing unit D does not come in contact with the apparatus main body 14 and is not directly supported by the apparatus main body 14.

When detaching the process cartridge B from the apparatus main body 14, the process cartridge B is pulled upward from the left-hand lower side to the right-hand upper side in contrast to the above case. Thus, the process cartridge B is detached from the apparatus main body 14.

The above process cartridge B is detached and mounted by resting a hand on a projecting strip 11c of a concave portion 17 of an upper frame 11a shown in FIG. 22 and a projecting strip 11c of a lower frame 11b. A toner frame 11 is integrated by welding the upper frame 11a and the lower frame 11b on a joining face U.

(Frame construction of process cartridge)

In the process cartridge B in this embodiment, the developing unit D and the cleaning unit CL are rotatably joined to each other with a joining pin 22 as a fulcrum. In the developing unit D, the toner frame 11 having a toner container (toner containing portion) 11A containing toner is joined by welding to a developing frame 12 for holding the developing means 9 such as the developing roller 9c, etc., in portions designated by reference numerals 701a, 701b. In the cleaning unit CL, the photosensitive drum 7, the cleaning means 10, such as the cleaning blade 10a, etc., and the charging roller 8 are mounted to the cleaning frame 13. Therefore, an arm 19 extending from the toner developing frame 12 is inserted between a side plate of the cleaning frame 13 and a partition plate (not shown) on an inner side of this side plate, and the joining pin 22 is fitted into a hole 20 penetrating the side plate, the arm 19 and the partition plate. A compression coil spring 23 is arranged between the developing frame 9 and the cleaning frame 13 in a compressing state. The cleaning frame 13 is biased in the counterclockwise direction and the developing frame 12 is biased in the clockwise direction in a state in which the hole 20 fitting the joining pin 22 thereinto is set to a center. Thus, spacer rollers (not shown) at both ends of the photosensitive drum 7 and the developing roller 9c come into pressure contact with each other.

FIG. 23 shows a supporting method of the photosensitive drum. A supporting shaft 24 is press-fitted into a central hole 13q of the round guide 13m formed in the cleaning frame 13. In the photosensitive drum 7, the gear flange 2 is fixed to each of both ends of a drum cylinder 7d. The supporting shaft 24 is rotatably fitted into a through hole 2d of the gear flange 2. One gear 2a formed in the gear flange 2 is engaged with a gear (not shown) connected to a driving source on a side of the apparatus main body 14 and receives a driving force. The other gear 2a' is engaged with a gear (not shown) fixed to an end portion of the transfer roller 4 and rotates the transfer roller 4.

An other preferable embodiment applying the present invention thereto will next be explained. In an image forming apparatus in this embodiment, the photosensitive drum 7 is directly mounted to the apparatus main body 14.

In the embodiment applying the present invention thereto and explained below, the image forming apparatus is an electrophotographic image forming apparatus for detachably mounting a toner replenishing container. The toner replenishing container has a toner containing portion containing toner, a toner discharge opening, an opening-closing member and a driving force receiving portion. The toner replenishing container supplies toner to a main body of the electrophotographic image forming apparatus. The toner discharge opening is arranged in the above toner containing portion to discharge the contained toner. The opening-closing member is arranged to open and close/seal the above toner discharge opening. The driving force receiving portion is arranged to receive driving force for moving the above opening-closing member so as to open the above toner discharge opening when the toner replenishing container is mounted on the main body of the electrophotographic image forming apparatus.

Electrophotographic Image Forming Apparatus to Which Toner is Replenished by Toner Replenishing Device FIG. 24 is a longitudinal sectional view of the electrophotographic image forming apparatus (hereinafter referred to as an image forming apparatus) mounting the toner replenishing container according to one embodiment of the present invention.

An original 101 is rested on an original glass stand 102 by an operator. An optical image of the original is projected onto the photosensitive drum 7 by plural mirrors and lenses arranged in an optical portion 103. A recording medium P of a size based on information input by the operator from an operating section (not shown) is selected from among plural recording media P (e.g., paper sheets, OHP sheets, etc.) stacked on plural feed cassettes 3a. A roller associated with the selected feed cassette 3a among plural pickup rollers 3b is rotated. One recording medium (sheet) P fed from the feed cassette 3a is conveyed up to the registration roller 3e via the conveying roller pair 3c and a conveying path 3n. The registration roller 3e conveys the recording medium P to the photosensitive drum 7 by synchronizing rotation of the photosensitive drum 7 with timing of a scan of the optical portion 103. A toner image on the photosensitive drum 7 is transferred to the recording medium P by the transfer means 4. Thereafter, the recording medium P is separated from the photosensitive drum 7 by separating means 4a. The recording medium P is then conveyed by the conveying guide 3f and reaches the fixing means 5. The toner image on the recording medium P is fixed by heat and pressure by the fixing means 5. Thereafter, the recording medium P is conveyed as follows.

1) In the case of one-sided copying, the recording medium P passes through a surface reversing portion 115 and is discharged to the tray 6 by the discharge roller pair 3m.

2) In the case of multiple copying, the recording medium P is conveyed to conveying portions 119, 120 by a flapper 3k of the surface reversing portion 115 and reaches the registration roller 3e. Thereafter, similar to the above case, the recording medium P passes through an image forming portion, a conveying portion and a fixing portion and is discharged to the tray 6.

3) In the case of double-sided copying, the recording medium P passes through the surface reversing portion 115 and is once partially discharged outside the apparatus by the discharge roller pair 3m. Thereafter, after a trailing end of the recording medium P passes through the flapper 3k, the above discharge roller pair 3m is reversely rotated. Then, the recording medium P is again conveyed inside the apparatus. This recording medium P is conveyed to the conveying portions 119, 120 and reaches the registration roller 3e. Similar to the above case, the recording medium P is then discharged to the tray 6 through the image forming portion, the conveying portion and the fixing portion.

In the electrophotographic image forming apparatus having the above construction, the developing means 9, the cleaning means 10 and the charging roller 8 are arranged around the photosensitive drum. The developing means 9 develops an electrostatic latent image formed on the photosensitive drum 7 by using toner. A toner replenishing container 50 for supplying the toner to the above developing means 9 is detachably mounted to a toner replenishing device 100 of the apparatus main body 14.

The toner reduced by the development is sequentially replenished from the toner replenishing device 100.

The present invention can be applied to both the photosensitive drum 7 mounted to the above process cartridge B and the photosensitive drum 7 arranged in the apparatus main body 14. These contents will next be explained in detail.

(Embodiment 1)

Figure 1:
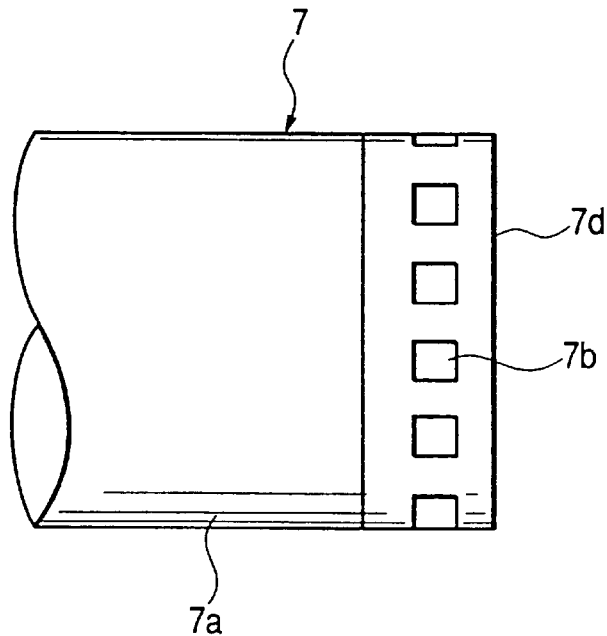
FIG. 1 is a side view of a drum cylinder of a photosensitive drum in an embodiment 1.
Figure 2:
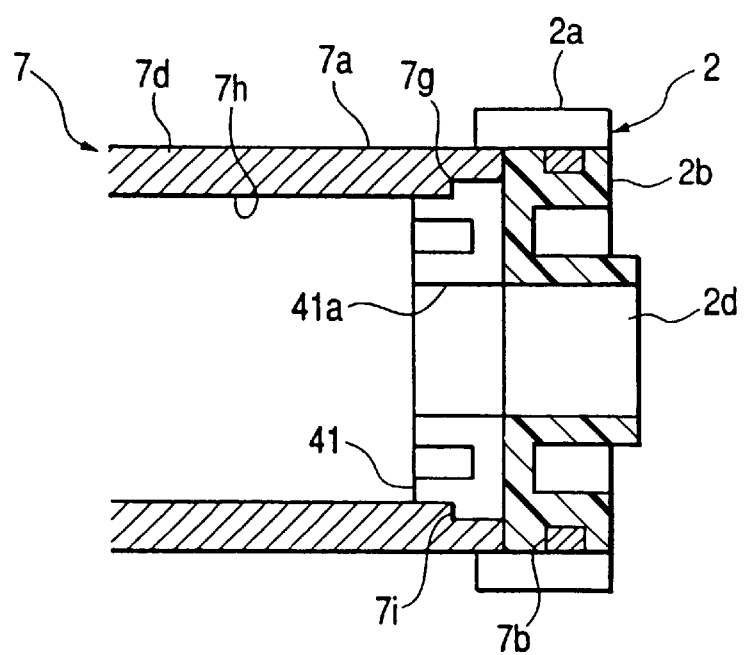
FIG. 2 is a longitudinal sectional view of the photosensitive drum in the embodiment 1.

FIGS. 1 and 2 show a photosensitive drum unit in which the present invention is embodied. In these figures, the photosensitive drum 7 has a photosensitive layer coating portion 7a arranged in an outer circumference of the photosensitive drum 7 except for an end portion of the drum cylinder 7d of hollow aluminum. Holes 7b for allowing resin to flow during molding of the gear flange 2 are formed in the end portion of the drum cylinder 7d such that these holes 7b extend through the drum cylinder 7d from an inner side to an outer side. The gear flange 2 has a gear 2a for transmitting driving force to the photosensitive drum 7. A through hole 2d for rotatably supporting the photosensitive drum 7 is formed at a center of the gear flange 2. A backup ring 41 constituting a backup in formation of the gear flange 2 is fitted from the deep side of an enlarged diameter inner circumferential portion 7g of an end portion of the drum cylinder 7d so as to engage with a step 7i between intermediate inner circumferential portions 7h. Here, a manufacturing process of the photosensitive drum unit will sequentially be explained. First, spigot joint working for forming the step 7i in an inside diameter portion of the end portion of the drum cylinder 7d made of a metal such as aluminum, etc. is performed. Thus, the enlarged diameter inner circumferential portion 7g is formed. Next, square holes 7b are formed in one line on a circular circumference near the end portion of the drum cylinder 7d (see FIG. 1). In this embodiment, each square hole has a size from 1.5 to 3 mm on one side. This hole is not limited to a square hole. For example, this hole may be a round hole. When the size of the holes 7b is too small, no resin easily flows. In contrast to this, when the size of the holes 7b is too large, strength of the drum cylinder 7d is reduced. In this boring process, no circularity of the drum cylinder 7d should be reduced. Accordingly, a receiving base having a cylindrical shape just fitted to the enlarged diameter inner circumferential portion 7g of the drum cylinder 7d and having concave portions conforming to the holes 7b to be formed is inserted. Punch press working is then performed from an outer side of the drum cylinder 7d to the concave portion of the receiving base. The drum cylinder 7d is then rotated by a constant amount and the punch press working is repeated.

Next, as shown in FIG. 2, the backup ring 41 is fitted to the drum cylinder 7d. An outer shape of the backup ring 41 is processed such that the backup ring 41 is just fitted to the enlarged diameter inner circumferential portion 7g spigot-joint worked in the end portion of the drum cylinder 7d. In this embodiment, 7-class (JIS B0401) fitting of H-js is performed as fitting of the backup ring 41 and the enlarged diameter inner circumferential portion 7g. The backup ring 41 is finished such that a clearance is slightly formed in an engaging portion in which the backup ring 41 is engaged with the intermediate inner circumferential portion 7h as an unprocessed deep side portion of the inner diameter of the drum cylinder 7d.

Next, the gear flange 2 is outsert-molded in the end portion of the drum cylinder 7d. At this time, a gear rim 2b is molded in an axial direction from the drum cylinder 7d to inner and outer circumferences and the end portion of the drum cylinder 7d. At this time, a shape of the gear flange 2 is determined such that resin passes through the hole 7b formed in the drum cylinder 7d. In this embodiment, a portion of the gear 2a is arranged just near the holes 7b. Therefore, torque is directly transmitted from the portion of the gear 2a to the drum cylinder 7d so that no torsional force is caused in the drum cylinder 7d and the gear flange 2.

The backup ring 41 prevents the resin from flowing onto an internal side of the drum cylinder 7d at the time of molding. A pin (not shown) of a die for forming the through hole 2d of the gear flange 2 is also fitted to a central hole 41a of the backup ring 41 and stops the flow of the resin. An inside diameter of the central hole 41a of the backup ring 41 is desirably set to be slightly smaller than an inside diameter of the through hole 2d of the gear flange 2. Further, a step is also desirably formed in the pin of the die. In this case, it is possible to prevent a burr from being caused in the clearance between the pin of the die and the backup ring 41 at a time when the resin is flowing. Molding pressure is applied to the backup ring 41 by the step portion 7i formed in the drum cylinder 7d. The backup ring 41 is made of aluminum constituting the same material as the drum cylinder 7d. In this case, since the backup ring 41 is manufactured by mechanical working, the backup ring 41 can be precisely manufactured, but its cost is increased. In contrast to this, the backup ring 41 may be also made of resin constituting the same material as the gear flange 2. In this case, since the backup ring 41 can be made by injection molding, the cost of the backup ring 41 can be reduced, but the accuracy of the backup ring 41 provided by the mechanical working is not obtained. A backup ring 41 optionally may not be provided. In this case, it is sufficient to form a receiving portion corresponding to the backup ring 41 in the die for molding the gear flange 2. This case is most suitable for molding, but requires that a long cylinder be inserted into the die at the time of molding, and requires a large-sized die.

For example, the gear flange 2 is molded by a material such as polyacetal (POM), polybutylene terephthalate (PBT), polycarbonate (PC) including fluorine, etc. When the gear flange 2 is adhered to the drum cylinder 7d, an olefinic resin such as polyacetal, etc., can not be used since it is difficult to adhere the gear flange 2 to the drum cylinder 7d using this resin. However, in this embodiment, it is not necessary to consider the restriction of the material of the gear flange 2 in manufacture.

In this embodiment, the gear flange 2 is formed in a shape having a portion of the gear 2a receiving torque and the through hole 2d for rotatably supporting the photosensitive drum 7. However, the gear flange 2 may be formed in a shape in which a coupling for receiving driving force from an unillustrated driving means of the image forming apparatus is formed in an end portion of the gear flange 2.

In this embodiment, the holes 7b are formed in one line on the circular circumference of the drum cylinder 7d, but the present invention is not limited to this case.

In this embodiment, one end side of the photosensitive drum 7 has been explained, but the same explanation also applies with respect to the other end side.

(Embodiment 2)

Figure 3:
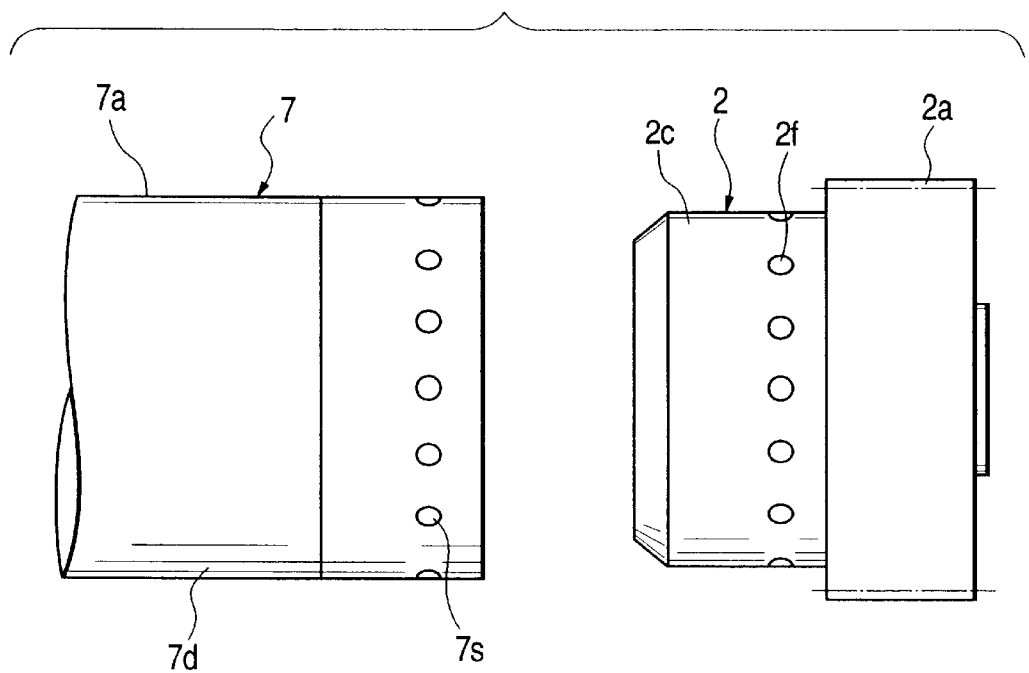
FIG. 3 is a side view of a photosensitive drum in an embodiment 2 before assembly.
Figure 4:
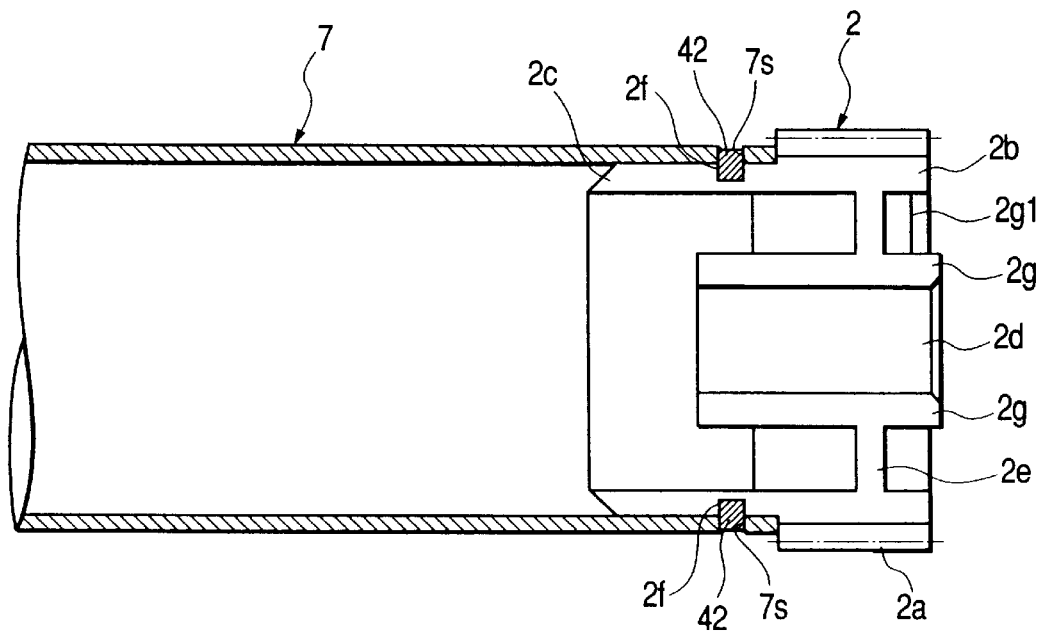
FIG. 4 is a longitudinal sectional view of the photosensitive drum in the embodiment 2.

FIG. 3 is an external appearance explanatory view for explaining a photosensitive drum and a gear flange in which the present invention is embodied. FIG. 4 is a view for explaining the section of a photosensitive drum unit. FIGS. 5 to 8 are views for explaining an assembly of the photosensitive drum unit.

As shown in FIG. 3, the gear flange 2 has a gear 2a for transmitting driving force to the photosensitive drum 7 and formed in an outer circumference of this gear flange 2, a cylindrical flange portion 2c to be fitted to a drum cylinder 7d, and holes 2f. The holes 2f are formed at a constant interval in a circumferential direction of the outer circumference. A fixing shaft 42 is fitted to each of the holes 2f in a radial direction. An arm portion 2e is formed in a disk shape on the inner circumferential side of a gear rim 2b of the gear flange 2. A boss 2g is formed at a center of the arm portion 2e, and a through hole 2d is formed in the boss 2g. A rib 2g1 is formed in the arm portion 2e in the radial direction.

Here, a manufacturing process of the photosensitive drum unit will sequentially be explained. As shown in FIG. 3, round holes 7s are formed in one line on a circular circumference near an end portion of the drum cylinder 7d made of a metal such as aluminum, etc. In this embodiment, each round hole has a diameter from 1.5 to 4 mm. This hole is not limited to a round hole, but may be, for example, a square hole. In this boring process, no circularity of the drum cylinder 7d should be reduced. Accordingly, a receiving base having a cylindrical shape just fitted to an inner diameter portion of the drum cylinder 7d and having concave portions conforming to the holes to be formed is inserted. Punch press is then performed from an outer side of the drum cylinder 7d to the concave portion of the receiving base. The drum cylinder 7d is then rotated by a constant amount and the punch press is repeated.

When the above gear flange 2 is inserted into the drum cylinder 7d, each round hole 7s in the end portion of the drum cylinder 7d is in registration with each round hole 2f of the gear flange 2. In this embodiment, these round holes 2f of the gear flange 2 are simultaneously formed when the above gear flange 2 is molded. Each round hole 2f has a diameter from 1.5 to 4 mm and a depth from 1.0 to 2.5 mm. This hole is not limited to a round hole, but may be, for example, a square hole. The hole 2f of the gear flange 2 and the hole 7s of the drum cylinder 7d are desirably formed in at least two positions on the circular circumference.

Figure 5:
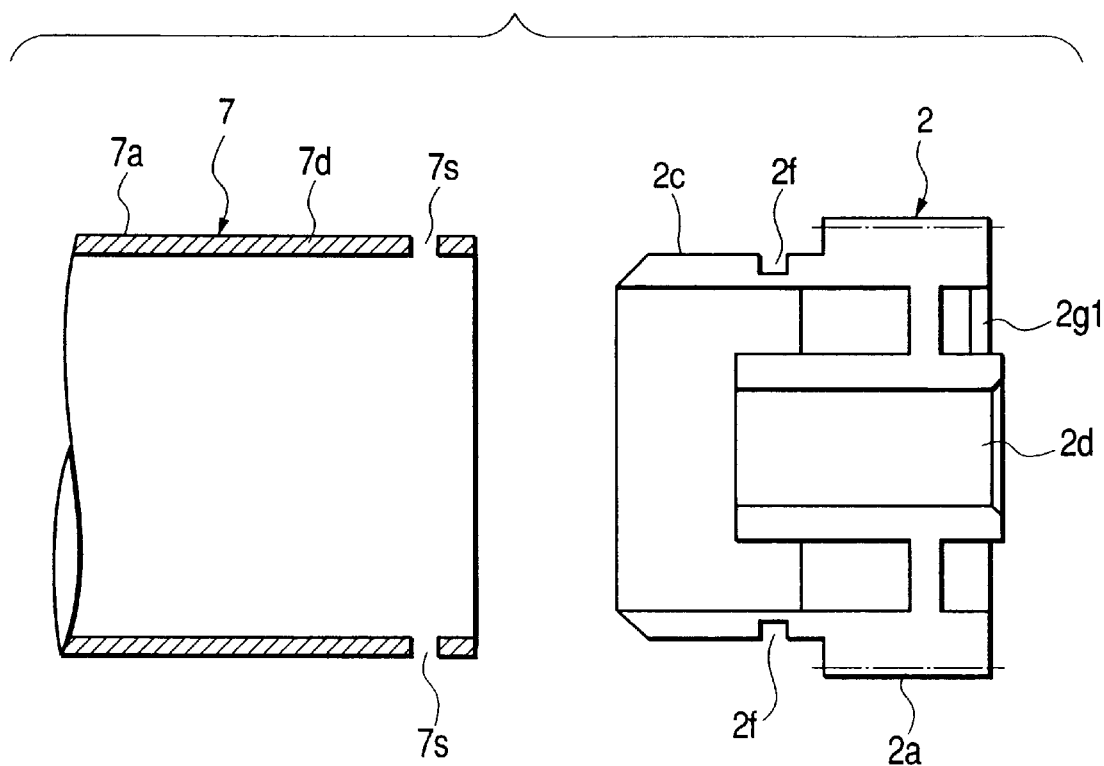
FIG. 5 is a longitudinal sectional view of a flange and a drum cylinder of the photosensitive drum in the embodiment 2.
Figure 6:
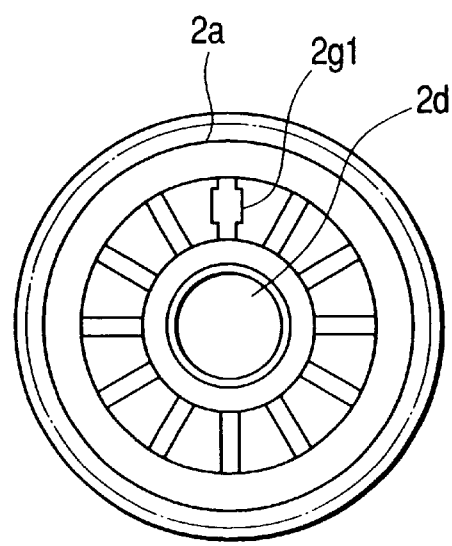
FIG. 6 is a front view of the flange in FIG. 5.

As shown in FIG. 5, a method for adjusting phases of each round hole 7s in the end portion of the drum cylinder 7d and each hole 2f of the gear flange 2 and inserting the gear flange 2 into the photosensitive drum 7 will next be explained. First, the photosensitive drum 7 is set on an insertion tool of the gear flange 2. At this time, the photosensitive drum 7 is positioned and fixed by a positioning member (not shown) on a side opposed to an insertion side of the gear flange 2. This insertion tool has a function (e.g., using a position detector using image processing, etc.) for detecting a position of the holes 7s of the photosensitive drum 7. The rib 2g1 is arranged in the gear flange 2 in a position in which this rib is in registration with the holes 2f in advance in a circumferential direction. When the gear flange 2 is inserted into the photosensitive drum 7 while the phases of the above holes 7s and the above rib 2g1 are adjusted, the insertion is performed by providing a function for inserting the gear flange 2 while the phase of the rib 2g1 of the gear flange 2 rotatably chucked is adjusted in a position corresponding to position data of the above holes 7s obtained from the position detector using the above image processing. In this embodiment, after the holes are formed in advance in the gear flange 2 and the photosensitive drum 7, these holes are combined with each other while two phases are aligned with each other. However, the holes 7s, 2f may be also simultaneously formed after the gear flange 2 is combined with the photosensitive drum 7.

A fastening method of the photosensitive drum 7 and the gear flange 2 will next be explained. The phases of the holes 7s of the above photosensitive drum 7 and the holes 2f of the gear flange 2 are adjusted. As shown in FIG. 7, the gear flange 2 is then inserted into the photosensitive drum 7. Thereafter, as shown in FIG. 7, a shaft 42 is press-fitted into each hole 7s of the photosensitive drum 7 and each hole 2f of the gear flange 2. The gear flange 2 is then fixed to the photosensitive drum 7. The above shafts 42 are press-fitted as shown in FIG. 8 if the unit constructed by inserting the gear flange 2 into the photosensitive drum 7 is rotated by a constant amount and the press-fit is repeated by a press-fitting tool.

Each of the above shaft 42 has a diameter as a press-fitting size (8-class (JIS B0401) fitting of H-k as mutual fitting in this embodiment) in each hole 7s of the photosensitive drum 7 and each hole 2f of the gear flange 2. Further, each shaft 42 has a length selected so as not to project from a surface of the above photosensitive drum 7 after the press-fit. In this embodiment, the shafts 42 are set to a cylindrical shaft having a diameter from 1.5 to 4 mm, but is not limited to a cylindrical shaft. For example, the shaft 42 may also be a prismatic shaft. Since each of the above shafts 42 is press-fitted into a hole 7s of the photosensitive drum 7 and a hole 2f of the gear flange 2, a tip of the shafts 42 is desirably chamfered. When a size of the above shafts 42 is too small, fastening force of the photosensitive drum 7 and the gear flange 2 is insufficient. In contrast to this, when the size of the shafts 42 is too large, there is a fear of a reduction in strength of the drum cylinder 7d of the photosensitive drum 7 and the gear flange 2. The above shafts 42 may be formed of the same material as the drum cylinder 7d of the photosensitive drum 7, such as a metal (aluminum, etc.), or the same material as the gear flange 2. In this embodiment, a portion of the gear 2a is arranged just near the holes 7s of the photosensitive drum 7. Therefore, torque is directly transmitted from the gear 2a to the drum cylinder 7d. Accordingly, no torsional force is caused in the drum cylinder 7d and the gear flange 2.

For example, the gear flange 2 is molded by a material such as polyacetal (POM), polybutylene terephthalate (PBT), polycarbonate (PC) including fluorine, etc. When the gear flange 2 is adhered to the drum cylinder 7d, an olefinic resin such as polyacetal, etc., can not be used since it is difficult to adhere the gear flange 2 to the drum cylinder 7d using this resin. However, in this embodiment, it is not necessary to consider the restriction of the material of the gear flange 2 in manufacture.

In this embodiment, the gear flange 2 is formed in a shape having a portion of the gear 2a receiving torque and the through hole 2d for rotatably supporting the photosensitive drum 7. However, the gear flange 2 may be formed in a shape in which a coupling for receiving driving force from an unillustrated driving means of the image forming apparatus is formed in an end portion of the gear flange 2.

In this embodiment, the holes 7s of the photosensitive drum 7 and the holes 2f of the gear flange 2 are formed in one line on the circular circumference of the drum cylinder 7d, but the present invention is not limited to this case.

In this embodiment, one end side of the photosensitive drum 7 has been explained, but the same explanation also applies to the other end side.

(Embodiment 3)

An embodiment 3 will next be explained in conjunction with FIGS. 9 to 13. FIG. 9 is an external appearance explanatory view for explaining a photosensitive drum and a gear flange embodying the present invention. FIG. 10 is an explanatory view for explaining an inserting time of the gear flange into the photosensitive drum. FIG. 11 is a cross-sectional view taken along the line XI—XI of FIG. 10. FIGS. 12 and 13 are views for explaining sections of the photosensitive drum and the gear flange after insertion molding.

The photosensitive drum 7 is similar to that in the above embodiment 2 and its explanation is therefore omitted here. In FIGS. 9 and 10, the gear flange 2 has a gear 2a for transmitting driving force to the photosensitive drum 7, a flange portion 2c fitted to the photosensitive drum 7, a through hole 2d for rotatably supporting the photosensitive drum 7, grooves 2h for receiving resin, ribs 2i for detent, a portion 2*j* held by a die at a time of insertion molding, and resin 43 for fixing the photosensitive drum 7 and the gear flange 2 (see FIGS. 12 and 13). The portion 2*j* is a space between a rim 2*b* and a boss 2*g* and extends until an arm portion 2*e* connecting the rim 2*b* and the boss 2*g*. Here, the grooves 2*h* are strip grooves formed in an outer circumference of the flange portion 2*c* in its circumferential direction. The ribs 2*i* for detent are arranged at the bottom of this groove 2*h* at a constant interval.

Here, a manufacturing process of a photosensitive drum unit sequentially will be explained. As shown in FIG. 9, round holes 7*s* are formed in one line on a circular circumference near an end portion of a drum cylinder 7*d* made of a metal such as aluminum, etc. In this embodiment, each round hole has a diameter from 1.5 to 4 mm. A boring method of the round holes 7*s* is similar to that in the embodiment 2 and its explanation is therefore omitted here.

In contrast to this, the gear flange 2 has a portion of a gear 2*a* for transmitting driving force to the photosensitive drum 7, a through hole 2*d* for rotatably supporting the photosensitive drum 7, and a flange portion 2*c* to be fitted to the photosensitive drum 7. Groove portions 2*h* are formed in this flange portion 2*c* in a longitudinal position corresponding to the round holes 7*s* in the end portion of the above drum cylinder 7*d* when the above gear flange 2 is inserted into the photosensitive drum 7. In this embodiment, the groove portions 2*h* are formed simultaneously when the above gear flange 2 is molded. Each groove portion 2*h* has a width from 1.5 to 4 mm and a depth from 1.0 to 2.5 mm.

FIG. 10 shows a state in which the gear flange 2 is inserted into the photosensitive drum 7. As mentioned above, when the above gear flange 2 is inserted into the the grooves 2*h* of the flange portion 2*c* register or align each other, and a space is formed by a non-bored portion of the above drum cylinder 7*d* (non-bored by the round holes 7*s*), and the above groove portions 2*h*. In this embodiment, as shown in FIG. 11 (a view taken along the line XI—XI of FIG. 10), a respective hole 7*s* is formed in each of twelve portions in a circumferential shape of the above photosensitive drum 7.

A fastening method of the above photosensitive drum 7 and the above gear flange 2 will next be explained by using FIGS. 12 and 13. First, the gear flange 2 and the photosensitive drum 7 are set on a molding machine in a unit state in which the gear flange 2 is inserted into the above photosensitive drum 7. At this time, the photosensitive drum 7 is positioned by an unillustrated positioning means on a side opposed to an insertion side of the gear flange 2. In contrast to this, the insertion side of the gear flange 2 is positioned by a die for insertion-molding resin for fastening the photosensitive drum 7 and the gear flange 2 by fitting the die to a holding portion 2*j* of the above gear flange 2. Further, the above round holes 7*s* of the photosensitive drum 7 are blocked by the die. In this embodiment, three portions (arranged at an equal interval of 120 degrees) among the above twelve portions of the round holes 7*s* are used as a gate of the molding machine and are insertion-molded. The molded resin 43 is injected via the round holes 7*s* of the drum cylinder 7*d* and flows to the non-bored portion of the above drum cylinder 7*d* (non-bored by the round hole 7*s*), and the above groove portions 2*h*. The resin 43 also flows to the round holes 7*s* blocked by the die, and the groove portions 2*h*. Thus, a space formed by the above photosensitive drum 7 and the above gear flange 2 is filled with this resin. In this manner, the above photosensitive drum 7 and the above gear flange 2 are integrated with each other.

When rotating force is applied from unillustrated driving means to the above gear flange 2, the rotating force is transmitted from the above gear flange 2 to the above resin 43. At this time, the above resin 43 and the above gear flange 2 do not slip relative to one another, but are fixed to each other when the ribs 2*i* are formed in the above groove portions 2*h* of the above gear flange 2 to secure the fastening force of the above resin 43 and the above gear flange 2. Thus, the driving force is reliably transmitted from the resin 43 to the above photosensitive drum 7. For example, the above resin is molded by a material such as polyacetal (POM), polybutylene terephthalate (PBT), polycarbonate (PC) including fluorine, etc.

In this embodiment, a portion of the gear 2*a* is arranged just near the holes 7*s* of the photosensitive drum 7. Therefore, torque is directly transmitted from the gear 2*a* to the drum cylinder 7*d*. Accordingly, no torsional force is caused in the drum cylinder 7*d* and the gear flange 2.

(Embodiment 4)

This embodiment will be explained in conjunction with FIGS. 14 to 18. FIG. 14 is an external appearance explanatory view for explaining a photosensitive drum and a gear flange in which the present invention is embodied. FIG. 15 is an explanatory view showing a state in which the gear flange is inserted into the photosensitive drum. FIG. 17 is an explanatory view for explaining sections of the photosensitive drum, the gear flange and a clearance holding thin film after insertion-molding.

In FIG. 14, the photosensitive drum 7 has a photosensitive layer coating portion 7*a* in the outer circumference of a drum cylinder 7*d*. Holes 7*s* are formed in an end portion of the drum cylinder 7*d* such that resin flows into these holes 7*s*. Similar to the above embodiment 3, the gear flange 2 has a gear 2*a* for transmitting driving force to the photosensitive drum 7, a flange portion 2*c* to be fitted to the photosensitive drum, a through hole 2*d* for rotatably supporting the photosensitive drum 7, grooves 2*h* for receiving the resin, ribs 2*i* for detent, a portion 2*j* held by a die at a time of inline-molding, and the resin 43 for fixing the photosensitive drum 7 and the gear flange 2.

In this embodiment, as shown in FIGS. 17 and 18, the clearance holding thin film 44 is formed in the outer circumference of the photosensitive drum 7 in its end portion. This clearance holding thin film 44 is rolled in contact with the outer circumference of a developing roller 9*c*. Further, a clearance (0.2 mm to 0.5 mm) for performing a suitable developing operation is secured in a developing area of the photosensitive drum 7 and the developing roller 9*c*.

A manufacturing process for the photosensitive drum unit is similar to that in the above embodiment 3 until the gear flange 2 is fitted to the photosensitive drum 7. Accordingly, an explanation of this process is omitted here.

When the photosensitive drum 7 and the gear flange 2 are fitted to each other, the photosensitive drum 7 and the gear flange 2 are set as shown in FIGS. 15 and 16.

A fastening method of the above photosensitive drum 7 and the above gear flange 2 and a forming method of the clearance holding thin film will next be explained in conjunction with FIGS. 15 and 16. The gear flange 2 and the photosensitive drum 7 are set on a molding machine in a unit state in which the gear flange 2 is inserted into the above photosensitive drum 7. At this time, the above photosensitive drum 7 is positioned by an unillustrated positioning means on a side opposed to an insertion side of the above gear flange 2.

In contrast to this, the insertion side of the above gear flange 2 is positioned by fastening the above photosensitive drum 7 and the above gear flange 2, and inserting a die for insertion-molding the resin into the holding portion 2*j* of the above gear flange 2 so as to form the clearance holding thin film 44 for maintaining a space between the above drum cylinder 7d and a cylindrical shaped portion of the developing roller 9c as a developer bearing member on a surface of the above drum cylinder 7d.

Further, the surface of the above drum cylinder 7d is covered with the die in a state in which a space having a size from 0.2 mm to 0.5 mm corresponding to the clearance holding thin film 44 shown in FIG. 17 is maintained. In this embodiment, portions near three portions (arranged at an equal interval of 120 degrees) among the above twelve portions of the round holes 7s are used as a gate of the molding machine with respect to the die covering the surface of the above drum cylinder 7d in the state in which the above space from 0.2 mm to 0.5 mm is maintained. These used portions (gates) are insertion-molded.

The molded resin 43 is injected from the above gate portions and passes through the above clearance holding thin film 44 and the above holes 7a. The molded resin 43 then flows to the above holes 7s and the above groove portion 2h, and a non-bored portion of the above drum cylinder 7d (non-bored by the holes 7s), and the above groove portions 2h. Thus, a space formed between the above photosensitive drum 7 and the above gear flange 2 is filled with the molded resin 43. Thus, the above photosensitive drum 7 and the above gear flange 2 are integrated with each other. Further, the space from 0.2 mm to 0.5 mm between the above drum cylinder surface and the above die is filled with the molded resin. Thus, the above clearance holding thin film 44 is formed to maintain the space from 0.2 mm to 0.5 mm between the above drum cylinder 7d and the cylindrical shaped portion of the above developing roller 9c. When the above gate portions form projections on a surface of the above clearance holding thin film 44, these projections have an influence on an image. Accordingly, the above gate portions are preferably recessed by one step by about 0.5 mm toward the above holes 7s.

Next, when rotating force is applied to the above gear flange 2 from an unillustrated direction, the rotating force is transmitted from the above gear flange 2 to the above resin 43. At this time, when the ribs 2i are formed in the above groove portions 2h of the above gear flange 2 to secure fastening force of the above resin 43 and the above gear flange 2, the above resin 43 and the above gear flange 2 are fixed to each other without slippage. In this embodiment, a portion of the gear 2a is arranged just near the above holes 7s. Therefore, torque is directly transmitted from the gear 2a to the drum cylinder 7d. Accordingly, no torsional force is caused in the drum cylinder 7d and the gear flange 2.

The entire face of an exposed metallic portion on the surface of the drum cylinder 7d is covered with the above clearance holding thin film 44 and is electrically insulated by forming the above clearance holding thin film 44 on the surface of the drum cylinder 7d. Therefore, it is not necessary to set a longitudinal size to be long so as to prevent leak generation on an unillustrated metallic cylindrical surface on a side of the developing roller 9c and a metallic cylindrical surface on a side of the drum cylinder 7d so that the longitudinal size can be shortened.

For example, the gear flange 2 is molded by a material such as polyacetal (POM), polybutylene terephthalate (PBT), polycarbonate (PC) including fluorine, etc. When the gear flange 2 is adhered to the drum cylinder 7d, an olefinic resin such as polyacetal, etc. can not be used since it is difficult to adhere the gear flange 2 to the drum cylinder 7d using this resin. However, in this embodiment, it is not necessary to consider the restriction of the material of the gear flange 2 in manufacture.

In this embodiment, the gear flange is formed in a shape in which this gear flange has a through hole for rotatably supporting the photosensitive drum and the gear portion receiving torque. However, a coupling for receiving driving force from an unillustrated driving means of an image forming apparatus may also be formed in an end portion of the gear flange.

In this embodiment, the holes 7s and the grooves 2h are formed in one line on the circular circumference of the drum cylinder, but are not limited to this case.

Further, one end side of the photosensitive drum has been explained in this embodiment, but the same explanation also applies to the other end side.

As explained above, in accordance with the above-mentioned embodiments, the flange is formed by flowing resin into holes formed in an end portion of the drum cylinder. Therefore, the drum cylinder and the flange can be strongly integrated with each other and reliability with respect to the problems of dislocation and running idle is improved. With this integration, no drum cylinder is simultaneously deformed and it is not necessary to lengthen the drum cylinder in advance in consideration of the deformation. Accordingly, an entire length of the electrophotographic photosensitive drum can be shortened so that the electrophotographic image forming apparatus can be made compact. Further, if this electrophotographic photosensitive drum is adopted in a process cartridge, an entire length of the process cartridge can be shortened so that the electrophotographic image forming apparatus detachably mounting the process cartridge thereto can be made compact.

In accordance with the above embodiments, the electrophotographic photosensitive drum can be provided by a method for press-fitting a shaft into holes formed in the end portion of the drum cylinder and a hole formed in the flange, and a method for insert-molding resin in the hole formed in the end portion of the drum cylinder and a groove formed in the flange. Accordingly, the drum cylinder and the flange are strongly integrated with each other and reliability with respect to the problems of dislocation and running idle is improved. With this integration, it is not necessary to lengthen the drum cylinder in advance in consideration of the deformation. Accordingly, an entire length of the electrophotographic photosensitive drum can be shortened so that the electrophotographic image forming apparatus can be made compact. Further, if this electrophotographic photosensitive drum is adopted in the process cartridge, an entire length of the process cartridge can be shortened so that the electrophotographic image forming apparatus detachably mounting the process cartridge thereto can be made compact.

In accordance with the above embodiments, the resin is insert-molded in the holes formed in the end portion of the drum cylinder and the grooves formed in the flange. Simultaneously, a clearance holding thin film for maintaining a clearance from 0.2 mm to 0.5 mm between the drum cylinder and a cylindrical shaped portion of the developing roller is formed on the surface of the drum cylinder. Therefore, the drum cylinder and the flange are strongly integrated with each other and reliability with respect to the problems of dislocation and running idle is improved. Simultaneously, it is not necessary to consider deformation of the drum cylinder in advance in fixing the flange to the drum cylinder, and it is not necessary to lengthen the drum cylinder in advance by leak measures in a longitudinal arrangement of the developing roller and the electrophotographic photosensitive drum. Accordingly, an overall length of the electrophotographic photosensitive drum can be shortened so that the electrophotographic image forming apparatus can be made compact. Further, if this electrophotographic photosensitive drum is adopted in the process cartridge, an overall length of the process cartridge can be shortened so that the electrophotographic image forming apparatus detachably mounting the process cartridge thereto can be made compact.

As mentioned above, in accordance with the present invention, no deformation is caused in joining a base body and the flange to each other.

While the invention has been described with reference to the structures disclosed therein, it is not confined to the details set forth and this application is intended to cover such modifications or changes as may come within the purposes of the improvements or the scope of the following claims.

What is claimed is:

1. A cylindrical electrophotographic photosensitive drum of an electrophotographic image forming apparatus, comprising:
   a metallic hollow cylindrical base body having plural holes formed in a radial direction near an end portion of said base body; and
   a flange formed of molded resin, which fills said plurality of holes so as to integrate said base body and the flange.

2. A cylindrical electrophotographic photosensitive drum according to claim 1, wherein said base body further comprises a step portion formed by an enlarged diameter inner circumferential portion in the end portion of said base body, said cylindrical electrophotographic photosensitive drum further comprises a backup ring fitted to a deep side of the enlarged diameter inner circumferential portion, and the molded resin of said flange integrates the base body, the flange and the backup ring.

3. A cylindrical electrophotographic photosensitive drum of an electrophotographic image forming apparatus, comprising:
   a metallic hollow cylindrical base body having plural holes penetrating the base body in a radial direction near an end portion of said base body; and
   a flange having a fitting portion fitted to an inner circumference of the end portion of said base body and a groove portion in said fitting portion;
   wherein the base body and the fitting portion of the flange are fitted to each other by aligning positions of the holes of said base body and the groove portion of said flange, and
   said base body and the flange are integrated with each other by molded resin disposed in the plural holes of said base body and the groove portion of said flange.

4. A cylindrical electrophotographic photosensitive drum of an electrophotographic image forming apparatus, comprising:
   a metallic hollow cylindrical base body having plural holes penetrating the base body in a radial direction near an end portion of said base body; and
   a flange having a fitting portion fitted to an inner circumference of the end portion of said base body and a groove portion in said fitting portion;
   wherein the base body and the fitting portion of the flange are fitted to each other by aligning positions of the holes of said base body and the groove portion of said flange;
   wherein said base body and the flange are integrated with each other by molded resin disposed in the holes of said base body and the groove portion of said flange; and
   wherein a clearance holding thin film for maintaining a clearance for development between said base body and a cylindrical shaped portion of a developer bearing member is simultaneously formed on a surface of said base body by the molded resin.

5. A cylindrical electrophotographic photosensitive drum according to claim 4, wherein said clearance for development has a size from 0.2 mm to 0.5 mm.

6. A cylindrical electrophotographic photosensitive drum according to claim 3 or 4, wherein the groove portion of said flange is a strip groove of the fitting portion in its circumferential direction.

7. A process cartridge detachably mountable to a main body of an electrophotographic image forming apparatus, comprising:
   an electrophotographic photosensitive drum having plural holes penetrating a metallic hollow cylindrical base body formed in a radial direction near an end portion of said base body, and a flange formed of molded resin, which fills said plural holes so as to integrate said base body and the flange; and
   process means acting on said electrophotographic photosensitive drum.

8. A process cartridge detachably mountable to a main body of an electrophotographic image forming apparatus, comprising:
   an electrophotographic photosensitive drum including:
      a metallic hollow cylindrical base body having plural holes penetrating the base body in a radial direction near the end portion of the base body, and
      a flange having a fitting portion fitted to an inner circumference of the end portion of said base body and a groove portion in said fitting portion,
      the base body and the fitting portion of the flange being fitted to each other by aligning positions of the holes of said base body and the groove portion of said flange, and
      said base body and the flange being integrated with each other by molded resin disposed in the holes of said base body and the groove portion of said flange; and
   process means acting on said electrophotographic photosensitive drum.

9. A process cartridge detachably mountable to a main body of an electrophotographic image forming apparatus, comprising:
   an electrophotographic photosensitive drum including:
      a metallic hollow cylindrical base body having plural holes penetrating the base body in a radial direction near an end portion of said base body, and
      a flange having a fitting portion fitted to an inner circumference of the end portion of said base body and a groove portion in said fitting portion,
      wherein the base body and the fitting portion of the flange are fitted to each other by aligning positions of the holes of said base body and the groove portion of said flange,
      said base body and the flange are integrated with each other by molded resin disposed in the holes of said base body and the groove portion of said flange, and
      a clearance holding thin film for maintaining a clearance for development between said base body and a cylindrical shaped portion of a developer bearing member is simultaneously formed on a surface of said base body by the molded resin; and
   process means acting on said electrophotographic photosensitive drum.

10. A process cartridge according to any one of claims 7, 8 or 9, wherein said process means includes at least one of charging means for charging said electrophotographic photosensitive drum, developing means for developing a latent image formed on said electrophotographic photosensitive drum, and cleaning means for removing toner remaining on said electrophotographic photosensitive drum.

11. An electrophotographic image forming apparatus for forming an image on a recording medium, comprising:

an electrophotographic photosensitive drum having plural holes penetrating a metallic hollow cylindrical base body formed in a radial direction near an end portion of said base body, and a flange formed of molded resin, which fills said plural holes so as to integrate said base body and the flange;

process means acting on said electrophotographic photosensitive drum; and conveying means for conveying said recording medium.

12. An electrophotographic image forming apparatus for forming an image on a recording medium, comprising:

an electrophotographic photosensitive drum including:
   a metallic hollow cylindrical base body having plural holes penetrating the base body in a radial direction near an end portion of said base body, and
   a flange having a fitting portion fitted to an inner circumference of the end portion of said base body and a groove portion in said fitting portion,
   wherein the base body and the fitting portion of the flange are fitted to each other by aligning positions of the holes of said base body and the groove portion of said flange, and
   said base body and the flange are integrated with each other by molded resin disposed in the holes of said base body and the groove portion of said flange;

process means acting on said electrophotographic photosensitive drum; and conveying means for conveying said recording medium.

13. An electrophotographic image forming apparatus for forming an image on a recording medium, comprising:

an electrophotographic photosensitive drum including:
   a metallic hollow cylindrical base body having plural holes penetrating the base body in a radial direction near an end portion of said base body, and
   a flange having a fitting portion fitted to an inner circumference of the end portion of said base body and a groove portion in said fitting portion,
   wherein the base body and the fitting portion of the flange are fitted to each other by aligning positions of the holes of said base body and the groove portion of said flange,
   said base body and the flange are integrated with each other by molded resin disposed in the holes of said base body and the groove portion of said flange, and
   a clearance holding thin film for maintaining a clearance for development between said base body and a cylindrical shaped portion of a developer bearing member is simultaneously formed on a surface of said base body by the molded resin;

process means acting on said electrophotographic photosensitive drum; and conveying means for conveying said recording medium.

* * * * *